(12) United States Patent
Yang

(10) Patent No.: US 11,198,500 B2
(45) Date of Patent: Dec. 14, 2021

(54) UNMANNED HELICOPTER

(71) Applicant: X-CONTROL SYSTEM CO., LTD., Beijing (CN)

(72) Inventor: Fan Yang, Beijing (CN)

(73) Assignee: X-CONTROL SYSTEM CO., LTD., Beijing (CN)

( * ) Notice: Subject to any disclaimer, the term of this patent is extended or adjusted under 35 U.S.C. 154(b) by 7 days.

(21) Appl. No.: 16/890,971

(22) Filed: Jun. 2, 2020

(65) Prior Publication Data
US 2020/0346739 A1 Nov. 5, 2020

Related U.S. Application Data

(63) Continuation of application No. 15/749,770, filed as application No. PCT/CN2015/085940 on Aug. 3, 2015, now Pat. No. 10,703,459.

(51) Int. Cl.
*B64C 11/28* (2006.01)
*B64C 27/08* (2006.01)
(Continued)

(52) U.S. Cl.
CPC .............. *B64C 11/28* (2013.01); *B64C 1/30* (2013.01); *B64C 27/08* (2013.01);
(Continued)

(58) Field of Classification Search
CPC ........... B64C 11/28; B64C 1/30; B64C 27/08; B64C 29/0033; B64C 39/024; B64C 2201/027; B64C 2201/102
See application file for complete search history.

(56) References Cited

U.S. PATENT DOCUMENTS 8,292,215 B2 * 10/2012 Olm .................. B64C 39/024
244/17.23
8,453,962 B2 * 6/2013 Shaw ................. B64C 27/28
244/17.23
(Continued)

FOREIGN PATENT DOCUMENTS

CN 104176248 A 12/2014
CN 104590556 A 5/2015
(Continued)

OTHER PUBLICATIONS

PCT International Search Report, PCT Application No. PCT/CN2015/085940, dated Apr. 29, 2016, 12 Pages.

*Primary Examiner* — Justin M Benedik
(74) *Attorney, Agent, or Firm* — Fenwick & West LLP

(57) ABSTRACT

The present invention relates to an unmanned helicopter. The unmanned helicopter comprises a fuselage. Two arms are respectively disposed on each of two sides of the fuselage. One end of each arm is connected to the fuselage, and the other end of each arm is provided with a rotor having a motor. The unmanned helicopter is characterized in that: the four arms are grouped into a front group and a rear group, two arms in each group are disposed symmetrically along the axis of the fuselage, the fuselage is movably connected to each arm, an angle between a length direction of any one of the two arms in each group and a corresponding rotation axis is an angle r, an angle between the rotation axis and a horizontal surface of the fuselage is an angle a, and an angle between a projection line of the rotation axis on the horizontal surface of the fuselage and the axis direction that extends outward the fuselage is an angle b. By ingeniously selecting values of the angle a, the angle r and the angle b, the structure of the unmanned helicopter in a folded state is very compact, thereby effectively saving space.

14 Claims, 28 Drawing Sheets

(51) Int. Cl.
*B64C 29/00* (2006.01)
*B64C 39/02* (2006.01)
*B64C 1/30* (2006.01)

(52) U.S. Cl.
CPC ........ *B64C 29/0033* (2013.01); *B64C 39/024* (2013.01); *B64C 2201/027* (2013.01); *B64C 2201/102* (2013.01)

(56) References Cited

U.S. PATENT DOCUMENTS

| | | | |
|---|---|---|---|
| 8,646,720 B2* | 2/2014 | Shaw | B64C 29/0025 244/17.23 |
| 9,187,174 B2 | 11/2015 | Shaw | |
| 2002/0104922 A1 | 8/2002 | Nakamura | |
| 2009/0008499 A1* | 1/2009 | Shaw | B64C 27/08 244/17.23 |
| 2012/0138732 A1* | 6/2012 | Olm | B64C 39/024 244/17.23 |
| 2016/0376004 A1* | 12/2016 | Claridge | B64C 27/08 701/3 |
| 2018/0118322 A1* | 5/2018 | Harris | B64C 39/024 |
| 2018/0170510 A1* | 6/2018 | Brock | B64C 1/063 |

FOREIGN PATENT DOCUMENTS

| | | |
|---|---|---|
| CN | 104691749 A | 6/2015 |
| CN | 204368422 U | 6/2015 |

\* cited by examiner

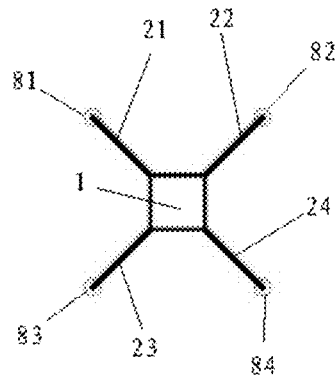 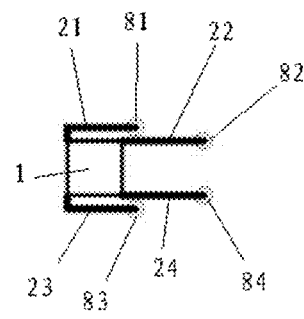 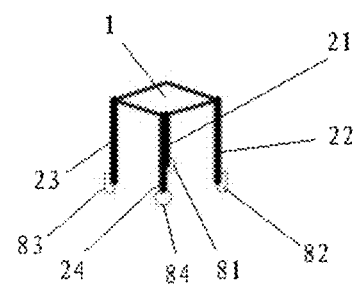
Fig. 3A  Fig. 3B  Fig. 3C
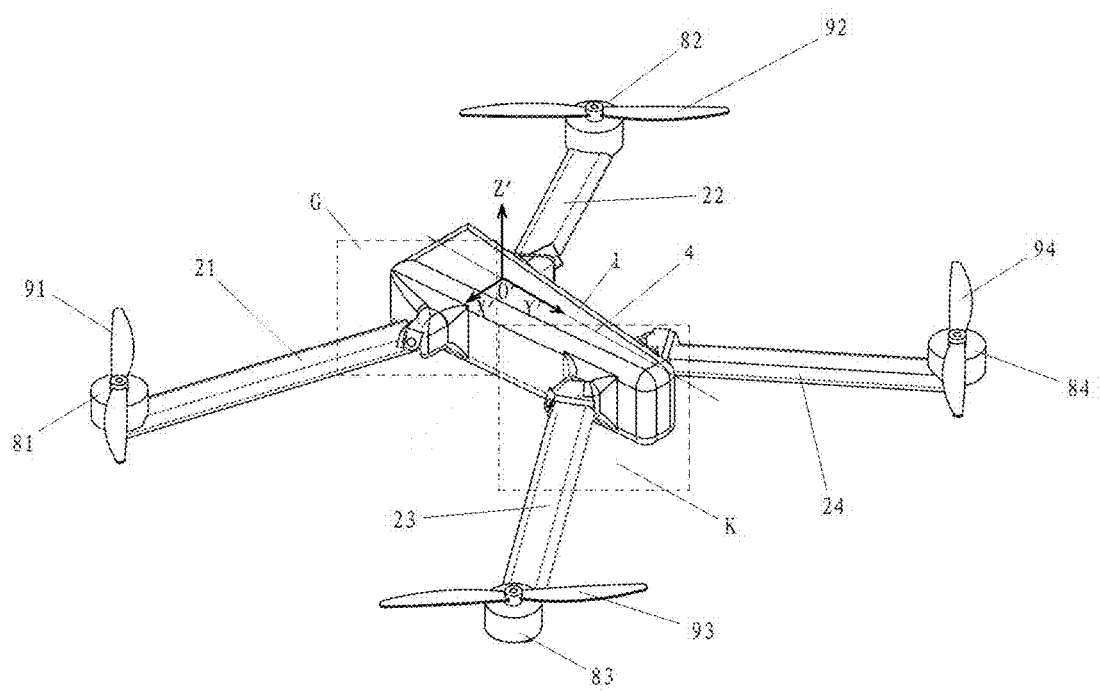
Fig. 4A

UNMANNED HELICOPTER

CROSS-REFERENCE TO RELATED APPLICATIONS

This application is a continuation of U.S. application Ser. No. 15/749,770 filed on Feb. 1, 2018, which is a National Stage Entry of International Application No. PCT/CN2015/085940 filed on Aug. 3, 2015, both of which is incorporated herein by reference in its entirety for all purposes.

FIELD OF THE DISCLOSURE

The present disclosure relates to an unmanned helicopter, and particularly to an unmanned helicopter with multiple rotors.

BACKGROUND OF THE DISCLOSURE

A multi-rotor helicopter is comprised of several groups of propellers or rotors which are distributed in a certain arrangement manner. The propellers are secured to arms, and arms are connected with a fuselage. This layout has a large size, and arms generally need to be folded to reduce the size upon carrying.

At present, ordinary folding methods comprise two manners: folding in opposed directions or folding in the same direction, which will be described below respectively.

Folding in opposed directions may comprise two manners: non-overlapping folding in opposed directions and overlapping folding in opposed directions, which will be described below respectively.

Non-overlapping folding in opposed directions: FIG. 1A is a top view of an unmanned helicopter employing arms which are non-overlappablely foldable in opposed directions when the arms are in a deployed state in the prior art. The figure does not show corresponding rotors installed at locations of motors 81, 82, 83, 84. As shown in FIG. 1A, when a sum of lengths of an arm 21 and an arm 22 is smaller than a length of the fuselage 1, non-overlapping folding in opposed directions can be performed. FIG. 1B is a top view of an unmanned helicopter employing arms which are non-overlappablely foldable in opposed directions when the arms are in a folded state in the prior art. As shown in FIG. 1B, the sum of lengths of the arm 21 and the arm 22 in non-overlapping folding is smaller than the length of the fuselage 1. A drawback of the arms which are non-overlappingly foldable in opposed directions is: the fuselage 1 is required to be longer, and relatively, the arms 21, 22, 23, 24 all are very short, so that the lengths of the arms are limited seriously. Therefore, if the lengths of arms are to be increased, the length or width of the fuselage needs to be increased at the same time so that the size after the folding becomes larger and the helicopter body becomes heavier.

Overlapping folding in opposed directions: FIG. 2A is a top view of an unmanned helicopter employing arms which are overlappablely foldable in opposed directions when the arms are in a deployed state in the prior art. The figure does not show corresponding rotors installed at locations of motors 81, 82, 83, 84. FIG. 2B is a top view of an unmanned helicopter employing arms which are overlappablely foldable in opposed directions when the arms are in a folded state in the prior art. As shown in FIG. 2A, a first rotation axis 31 and a second rotation axis 32 are disposed asymmetrically so that the arm 21 and arm 22 may partially overlap in the length direction of the fuselage 1. A drawback of the arms which are overlappingly foldable in opposed directions is: folding in opposed directions employs parallel axes, namely, rotation axes of a group of arms to be folded in opposed directions are parallel to each other, which causes an inter-axis distance between folding axes of the arms to be larger than the lengths of arms.

Folding in the same direction may comprise two manners: folding horizontally in the same direction and folding vertically in the same direction, which will be introduced respectively.

Folding horizontally in the same direction: FIG. 3A is a top view of an unmanned helicopter employing arms which are foldable in the same direction when the arms are in a deployed state in the prior art. The figure does not show corresponding rotors installed at locations of motors 81, 82, 83, 84. When arms are folded horizontally in the same direction, FIG. 3B is a top view of an unmanned helicopter employing arms which are foldable in the same direction when the arms are folded horizontally in the same direction in the prior art, wherein the arms 21, 22, 23 and 24 are all folded in the same horizontal direction towards one side of the fuselage 1. A drawback of the arms which are horizontally foldable in opposed directions is: the overall length in the folded state is larger than the length of a single arm plus the length of the fuselage.

Folding vertically in the same direction: FIG. 3A is a top view of an unmanned helicopter employing arms which are foldable in the same direction when the arms are in a deployed state in the prior art. The figure does not show corresponding rotors installed at locations of motors 81, 82, 83, 84. When arms are folded vertically in the same direction, FIG. 3C is a top view of an unmanned helicopter employing arms which are foldable in the same direction when the arms are folded vertically in the same direction in the prior art, wherein the arms 21, 22, 23 and 24 are all folded in the same direction and downwardly perpendicular to a plane where the fuselage 1 lies. A drawback of the arms which are vertically foldable in the same direction is: although the height in the folded state is only larger than the length of a single arm, an empty space formed by the fuselage area and the arm length is left in the middle, and the size in the folded state cannot be effectively reduced.

SUMMARY OF THE INVENTION

The technical problem to be solved by the present disclosure is to provide an unmanned helicopter employing inclined rotation axes. The arms of the unmanned helicopter may rotate about the inclined rotation axes and are stowed compactly during the folding and stowing procedure, thereby effectively reducing space occupied by the helicopter in the folded and stowed state.

To solve the above technical problem, a four-arm unmanned helicopter according to the present disclosure comprises a fuselage, two arms are provided on each side of the fuselage respectively, one end of each of said arms is connected with the fuselage, and the other end of each of the arms is used for arranging a rotor having a motor, wherein:

The four arms are grouped into a front group and a rear group, the first group of two arms are arranged symmetrically relative to an axis of the fuselage, and when the two arms are completely deployed, each of the arms is at an acute angle relative to a direction of an axis extending outward the fuselage. The second group of two arms are arranged symmetrically relative to the same axis of the fuselage, and when the two arms are completely deployed, each of the arms is at an acute angle relative to the direction of the axis extending outward the fuselage;

the fuselage and each of said arms employ a movable connection, wherein:

the movable connections of the first group of two arms enables one end of each arm of the first group connected with the fuselage to respectively rotate about a first or second rotation axis at a location of the respective movable connection, wherein a length direction of any arm of the first group of arms and its corresponding first or second rotation axis form an angle $r_1$, $20°<r_1<90°$, an angle formed by the first or second rotation axis and the horizontal surface of the fuselage is angle $a_1$, $1°<a_1<86°$ or $-86°<a_1<-1°$, meanwhile, a projection line of the first or second rotation axis on the horizontal surface of the fuselage and the direction of the axis extending outward the fuselage form an angle $b_1$, $30°<b_1<90°$;

the movable connections of the second group of two arms enables one end of each arm of the second group connected with the fuselage to respectively rotate about a third or fourth rotation axis at the location of the respective movable connection, wherein a length direction of any arm of the second group of arms and its corresponding third or fourth rotation axis form an angle $r_2$, $20°<r_2<160°$, an angle formed by the third or fourth rotation axis and the horizontal surface of the fuselage is angle $a_2$, $1°<a_2<86°$ or $-86°<a_2<-1°$, wherein $a_2$ and $a_1$ have the same plus or minus sign, meanwhile, a projection line of the third or fourth rotation axis on the horizontal surface of the fuselage and the direction of the axis extending outward the fuselage form an angle $b_2$, $90°<b_2<150°$.

It needs to be appreciated that the arms here comprise rectilinear arms and curved arms, etc. As far as non-rectilinear arms such as curved arms, it is possible to describe the angles a, b and r by means of straight-line connection lines between rotation axes and geometrical centers of the corresponding motors. Therefore, the situations of curved arms also fall within the extent of protection of the present disclosure.

Preferably, in the unmanned helicopter:

a length direction of any arm of the first group of arms and its corresponding first or second rotation axis form an angle $r_1$, $72°<r_1<80°$, an angle formed by the first or second rotation axis and the horizontal surface of the fuselage is angle $a_1$, $23°<a_1<31°$, meanwhile, a projection line of the first or second rotation axis on the horizontal surface of the fuselage and the direction of the axis extending outward the fuselage form an angle $b_1$, $43°<b_1<51°$, a length direction of any arm of the second group of arms and its corresponding third or fourth rotation axis form an angle $r_2$, $114°<r_2<122°$, an angle formed by the third or fourth rotation axis and the horizontal surface of the fuselage is angle $a_2$, $23°<a_2<31°$, meanwhile, a projection line of the third or fourth rotation axis on the horizontal surface of the fuselage and the direction of the axis extending outward the fuselage form an angle $b_2$, $115°<b_2<123°$.

More preferably, in the unmanned helicopter:

a length direction of any arm of the first group of arms and its corresponding first or second rotation axis form an angle $r_1$, $74°<r_1<78°$, an angle formed by the first or second rotation axis and the horizontal surface of the fuselage is angle $a_1$, $25°<a_1<29°$, meanwhile, a projection line of the first or second rotation axis on the horizontal surface of the fuselage and the direction of the axis extending outward the fuselage form an angle $b_1$, $45°<b_1<49°$, a length direction of any arm of the second group of arms and its corresponding third or fourth rotation axis form an angle $r_2$, $116°<r_2<120°$, an angle formed by the third or fourth rotation axis and the horizontal surface of the fuselage is angle $a_2$, $25°<a_2<29°$, meanwhile, a projection line of the third or fourth rotation axis on the horizontal surface of the fuselage and the direction of the axis extending outward the fuselage form an angle $b_2$, $117°<b_2<121°$.

More preferably, in the unmanned helicopter:

a length direction of any arm of the first group of arms and its corresponding first or second rotation axis form an angle $r_1$, $75°<r_1<76°$, an angle formed by the first or second rotation axis and the horizontal surface of the fuselage is angle $a_1$, $26°<a_1<27°$, meanwhile, a projection line of the first or second rotation axis on the horizontal surface of the fuselage and the direction of the axis extending outward the fuselage form an angle $b_1$, $47°<b_1<48°$, a length direction of any arm of the second group of arms and its corresponding third or fourth rotation axis form an angle $r_2$, $117°<r_2<118°$, an angle formed by the third or fourth rotation axis and the horizontal surface of the fuselage is angle $a_2$, $26°<a_2<27°$, meanwhile, a projection line of the third or fourth rotation axis on the horizontal surface of the fuselage and the direction of the axis extending outward the fuselage form an angle $b_2$, $119°<b_2<120°$.

More preferably, in the unmanned helicopter, the fuselage and each of said arms employ therebetween a movable connection which is articulation, wherein a first or second articulation axis at the ends of the first group of arms connected with the fuselage is respectively the corresponding first or second rotation axis; a third or fourth articulation axis at the ends of the second group of arms connected with the fuselage is respectively the corresponding third or fourth rotation axis.

More preferably, in the unmanned helicopter, the end of each of the four arms connected with the fuselage is provided with a lug, the fuselage is correspondingly provided with four protrusions, wherein the four lugs form articulation with the four protrusions respectively.

More preferably, in the unmanned helicopter, each of said lugs is provided with a lug through hole, each of said protrusions corresponding thereto is provided with a protrusion through hole, and each pin passes through each of said lugs through hole and the corresponding protrusion through hole to form articulation.

More preferably, in the unmanned helicopter, a length of each of the four arms is larger than a distance between the folding axis and a neighboring folding axis located on the same side of the fuselage; when the four arms all respectively rotate to get into a folded state, as viewed from the angle of top view, the other ends of the first group of two arms for arranging rotors having motors and the lugs at the ends of the first group connected with the fuselage can respectively be located on both sides of the protrusions of the second group located on the same side of the fuselage; at the same time, when the four arms all respectively rotate to get into the folded state, as viewed from the angle of top view, the other ends of the second group of two arms for arranging rotors having motors and the lugs at the ends of the second group connected with the fuselage can respectively be located on both sides of the protrusions of the first group located on the same side of the fuselage.

More preferably, in the unmanned helicopter, the rotors are detachable, and the four arms in the folded state carry or do not carry the rotors. More preferably, a foldable rotor is employed, namely, the rotor is comprised of a left sheet, a right sheet and a middle blade hub, and each sheet of the rotor is connected with the blade hub at the base via a axis in a vertical direction. Upon folding, the two sheets rotate towards each other. The sheets are folded on the same side and towards the center of the fuselage, thereby achieving the purpose of not increasing the folding size without detaching the sheets.

With the above structure, the present disclosure has the following advantageous technical effect: the inclined rotation axes enable the arms to rotate with a single degree of freedom during folding; as viewed in the three-dimensional space, the rotors move in X, Y and Z directions of the three-dimensional space, the arms after being folded overlap in a crossed manner, meanwhile the arms do not interfere with one another so that the structure of the unmanned helicopter in the folded state is very compact and effectively saves space so that the helicopter occupies a space as small as possible, so the size of the fuselage may be reduced in the case of the same deployment size. Meanwhile, the single degree of freedom design substantially increases reliability of system connection so that the service life of the unmanned helicopter is substantially prolonged. More preferably, as viewed from the top view, when the arms of the unmanned helicopter are in a folded and stowed state, the distal ends of the arms of the present disclosure go beyond the rotation axes of the arms on the opposite side so that a more compact over-overlapping folding effect is achieved.

According to the same technical concept, the present disclosure may further provide a six-arm unmanned helicopter according to the present disclosure, comprising a fuselage, three arms are provided on each side of the fuselage respectively, one end of each of said arms is connected with the fuselage, and the other end of each of the arms is used for arranging a rotor having a motor, wherein:

The six arms are grouped into three groups in turn in the direction of the fuselage: a first group, a second group and a third group respectively, the first group of two arms are arranged symmetrically relative to an axis of the fuselage, and when the two arms are completely deployed, each of the arms is at an acute angle relative to a direction of the axis extending outward the fuselage; the second group of two arms are arranged symmetrically relative to the same axis of the fuselage, and when the two arms are completely deployed, each of the arms is at an acute angle, a right angle or an obtuse angle relative to the direction of the axis extending outward the fuselage; the third group of two arms are arranged symmetrically relative to the same axis of the fuselage, and when the two arms are completely deployed, each of the arms is at an acute angle relative to the direction of the axis extending outward the fuselage;

the fuselage and each of said arms employ a movable connection therebetween, wherein:

the movable connection of the first group of two arms enables one end of each arm of the first group connected with the fuselage to respectively rotate about a first or second rotation axis at a location of the respective movable connection, wherein a length direction of any arm of the first group of arms and its corresponding first or second rotation axis form an angle $r_1$, $20°<r_1<90°$, an angle formed by the first or second rotation axis and the horizontal surface of the fuselage is angle $a_1$, $1°<a_1<86°$ or $-86°<a_1<-1°$, meanwhile, a projection line of the first or second rotation axis on the horizontal surface of the fuselage and the direction of the axis extending outward the fuselage form an angle $b_1$, $30°<b_1<90°$;

the movable connection of the second group of two arms enables one end of each arm of the second group connected with the fuselage to respectively rotate about a third or fourth rotation axis at the location of the respective movable connection, wherein a length direction of any arm of the second group of arms and its corresponding third or fourth rotation axis form an angle $r_2$, $20°<r_2<160°$, an angle formed by the third or fourth rotation axis and the horizontal surface of the fuselage is angle $a_2$, $1°<a_2<86°$ or $-86°<a_2<-1°$, wherein $a_2$ and $a_1$ have the same plus or minus sign, meanwhile, a projection line of the third or fourth rotation axis on the horizontal surface of the fuselage and the direction of the axis extending outward the fuselage form an angle $b_2$, $90°<b_2<150°$;

the movable connection of the third group of two arms enables one end of each arm of the third group connected with the fuselage to respectively rotate about a fifth or sixth rotation axis at the location of the respective movable connection, wherein a length direction of any arm of the third group of arms and its corresponding fifth or sixth rotation axis form an angle $r_3$, $90°<r_3<160°$, an angle formed by the fifth or sixth rotation axis and the horizontal surface of the fuselage is angle $a_3$, $1°<a_3<86°$ or $-86°<a_3<-1°$, wherein $a_3$ and $a_1$ have the same plus or minus sign, meanwhile, a projection line of the fifth or sixth rotation axis on the horizontal surface of the fuselage and the direction of the axis extending outward the fuselage form an angle $b_3$, $90°<b_3<150°$.

More preferably, in the unmanned helicopter, a length direction of any arm of the first group of two arms and its corresponding first or second rotation axis form an angle $r_1$, $68°<r_1<76°$, an angle formed by the first or second rotation axis and the horizontal surface of the fuselage is angle $a_1$, $21°<a_1<29°$, meanwhile, a projection line of the first or second rotation axis on the horizontal surface of the fuselage and the direction of the axis extending outward the fuselage form an angle $b_1$, $55°<b_1<63°$, a length direction of any arm of the second group of two arms and its corresponding third or fourth rotation axis form an angle $r_2$, $50°<r_2<58°$, an angle formed by the third or fourth rotation axis and the horizontal surface of the fuselage is angle $a_2$, $28°<a_2<36°$, meanwhile, a projection line of the third or fourth rotation axis on the horizontal surface of the fuselage and the direction of the axis extending outward the fuselage form an angle $b_2$, $49°<b_2<57°$;

a length direction of any arm of the third group of two arms and its corresponding fifth or sixth rotation axis form an angle $r_3$, $96°<r_3<104°$, an angle formed by the fifth or sixth rotation axis and the horizontal surface of the fuselage is angle $a_3$, $22°<a_3<30°$, meanwhile, a projection line of the fifth or sixth rotation axis on the horizontal surface of the fuselage and the direction of the axis extending outward the fuselage form an angle $b_3$, $114°<b_3<122°$.

More preferably, in the unmanned helicopter, a length direction of any arm of the first group of two arms and its corresponding first or second rotation axis form an angle $r_1$, $70°<r_1<74°$, an angle formed by the first or second rotation axis and the horizontal surface of the fuselage is angle $a_1$, $23°<a_1<27°$, and meanwhile, a projection line of the first or second rotation axis on the horizontal surface of the fuselage and the direction of the axis extending outward the fuselage form an angle $b_1$, $57°<b_1<61°$, a length direction of any arm of the second group of two arms and its corresponding third or fourth rotation axis form an angle $r_2$, $52°<r_2<56°$, an angle formed by the third or fourth rotation axis and the horizontal surface of the fuselage is angle $a_2$, $30°<a_2<34°$, and meanwhile, a projection line of the third or fourth rotation axis on the horizontal surface of the fuselage and the direction of the axis extending outward the fuselage form an angle $b_2$, $51°<b_2<55°$;

a length direction of any arm of the third group of two arms and its corresponding fifth or sixth rotation axis form an angle $r_3$, $98°<r_3<102°$, an angle formed by the fifth or sixth rotation axis and the horizontal surface of the fuselage is angle $a_3$, $24°<a_3<28°$, and meanwhile, a projection line of the fifth or sixth rotation axis on the horizontal surface of the fuselage and the direction of the axis extending outward the fuselage form an angle $b_3$, $116°<b_3<120°$;

More preferably, in the unmanned helicopter, a length direction of any arm of the first group of two arms and its corresponding first or second rotation axis form an angle $r_1$, $71°<r_1<72°$, an angle formed by the first or second rotation axis and the horizontal surface of the fuselage is angle $a_1$, $25°<a_1<26°$, and meanwhile, a projection line of the first or second rotation axis on the horizontal surface of the fuselage and the direction of the axis extending outward the fuselage form an angle $b_1$, $58°<b_1<59°$, a length direction of any arm of the second group of two arms and its corresponding third or fourth rotation axis form an angle $r_2$, $53°<r_2<54°$, an angle formed by the third or fourth rotation axis and the horizontal surface of the fuselage is angle $a_2$, $31°<a_2<32°$, and meanwhile, a projection line of the third or fourth rotation axis on the horizontal surface of the fuselage and the direction of the axis extending outward the fuselage form an angle $b_2$, $53°<b_2<54°$;

a length direction of any arm of the third group of two arms and its corresponding fifth or sixth rotation axis form an angle $r_3$, $100°<r_3<101°$, an angle formed by the fifth or sixth rotation axis and the horizontal surface of the fuselage is angle $a_3$, $25°<a_3<26°$, and meanwhile, a projection line of the fifth or sixth rotation axis on the horizontal surface of the fuselage and the direction of the axis extending outward the fuselage form an angle $b_3$, $117°<b_3<118°$.

More preferably, in the unmanned helicopter, the fuselage and each of said arms employ therebetween a movable connection which is articulation, wherein a first and second articulation axis at the ends of the first group of two arms connected with the fuselage is respectively the corresponding first or second rotation axis; a third or fourth articulation axis at the ends of the second group of two arms connected with the fuselage is respectively the corresponding third or fourth rotation axis; a fifth or sixth articulation axis at the ends of the third group of two arms connected with the fuselage is respectively the corresponding fifth or sixth rotation axis.

More preferably, in the unmanned helicopter, an end of each of the six arms connected with the fuselage is provided with a lug, the fuselage is correspondingly provided with six protrusions, wherein the six lugs form articulation with the six protrusions respectively.

More preferably, in the unmanned helicopter, each of said lugs is provided with a lug through hole, each of said protrusions corresponding thereto is provided with a protrusion through hole, and each pin passes through each of said lug through hole and the corresponding protrusion through hole to form articulation.

More preferably, in the unmanned helicopter, the lengths of the first arm and second arm in the first group of arms and the fifth arm and sixth arm in the third group of arms are all larger than the length of the fuselage, and the lengths of the arms of the second group of arms are not limited, when the six arms all respectively rotate to get into a folded state, as viewed from the angle of top view, the other ends of the first group of two arms for arranging rotors having motors and the lugs at the ends of the first group connected with the fuselage can respectively be located on both sides of the protrusions of the third group located on the same side of the fuselage, at the same time, when the six arms all respectively rotate to get into the folded state, as viewed from the angle of top view, the other ends of the third group of two arms for arranging rotors having motors and the lugs at the ends of the third group connected with the fuselage can respectively be located on both sides of the protrusions of the first group located on the same side of the fuselage, at the same time, the third arm and fourth arm in the second group of arms respectively rotate and are also simultaneously in the folded state, their folding direction is identical with that of the first group of arms or second group of arms.

More preferably, in the unmanned helicopter, the rotors are detachable, and the six arms in the folded state carry or do not carry the rotors.

The six-arm unmanned helicopter achieves the following advantageous effects: as observed in the three directions, namely, the fuselage vertical height direction, the fuselage length direction and the fuselage width direction, it can be appreciated that in the three-dimensional space of the present disclosure, the folded and stowed state makes full use of the space so that the folded and stowed state is very compact. This derives from the smart angle setting of the respective rotation axes of the six arms in the present disclosure, namely, selection of their respective angle r, angle a and angle b. Meanwhile, the above single degree of freedom design substantially increases reliability of system connection so that the service life of the unmanned helicopter is substantially prolonged.

According to the same technical concept, the present disclosure may further provide an eight-arm unmanned helicopter according to the present disclosure, comprising a fuselage, four arms are provided on each side of the fuselage respectively, one end of each of said arms is connected with the fuselage, and the other end of each of the arms is used for arranging a rotor having a motor, wherein:

the eight arms are grouped into four groups in turn in the direction of the fuselage: a first group, a second group, a third group and a fourth group respectively, the first group of two arms are arranged symmetrically relative to an axis of the fuselage, and when the two arms are completely deployed, each of the arms is at an acute angle relative to a direction of the axis extending outward the fuselage; the second group of two arms are arranged symmetrically relative to the same axis of the fuselage, and when the two arms are completely deployed, each of the arms is at an acute angle, a right angle or an obtuse angle relative to the direction of the axis extending outward the fuselage; the third group of two arms are arranged symmetrically relative to the same axis of the fuselage, and when the two arms are completely deployed, each of the arms is at an acute angle, a right angle or an obtuse angle relative to the direction of the axis extending outward the fuselage; the fourth group of two arms are arranged symmetrically relative to the same axis of the fuselage, and when the two arms are completely deployed, each of the arms is at an acute angle relative to the direction of the axis extending outward the fuselage;

the fuselage and each of said arms employ a movable connection therebetween, wherein:

the movable connection of the first group of two arms enables one end of each arm of the first group connected with the fuselage to respectively rotate about a first or second rotation axis at a location of the respective movable connection, wherein a length direction of any arm of the first group of arms and its corresponding first or second rotation axis form an angle $r_1$, $20°<r_1<90°$, an angle formed by the first or second rotation axis and the horizontal surface of the fuselage is angle $a_1$, $1°<a_1<86°$ or $-86°<a_1<-1°$, meanwhile, a projection line of the first or second rotation axis on the horizontal surface of the fuselage and the direction of the axis extending outward the fuselage form an angle $b_1$, $30°<b_1<90°$;

the movable connection of the second group of two arms enables one end of each arm of the second group connected with the fuselage to respectively rotate about a third or fourth rotation axis at the location of the respective movable connection, wherein a length direction of any arm of the second group of arms and its corresponding third or fourth rotation axis form an angle $r_2$, $20°<r_2<160°$, an angle formed by the third or fourth rotation axis and the horizontal surface of the fuselage is angle $a_2$, $1°<a_2<86°$ or $-86°<a_2<-1°$, wherein $a_2$ and $a_1$ have the same plus or minus sign, and meanwhile, a projection line of the third or fourth rotation axis on the horizontal surface of the fuselage and the direction of the axis extending outward the fuselage form an angle $b_2$, $30°<b_2<150°$;

the movable connection of the third group of two arms enables one end of each arm of the third group connected with the fuselage to respectively rotate about a fifth or sixth rotation axis at the location of the respective movable connection, wherein a length direction of any arm of the third group of arms and its corresponding fifth or sixth rotation axis form an angle $r_3$, $20°<r_3<160°$, an angle formed by the fifth or sixth rotation axis and the horizontal surface of the fuselage is angle $a_3$, $1°<a_3<86°$ or $-86°<a_3<-1°$, wherein $a_3$ and $a_1$ have the same plus or minus sign, and meanwhile, a projection line of the fifth or sixth rotation axis on the horizontal surface of the fuselage and the direction of the axis extending outward the fuselage form an angle $b_3$, $30°<b_3<150°$;

the movable connection of the fourth group of two arms enables one end of each arm of the fourth group connected with the fuselage to respectively rotate about a seventh or eighth rotation axis at the location of the respective movable connection, wherein a length direction of any arm of the fourth group of arms and its corresponding seventh or eighth rotation axis form an angle $r_4$, $90°<r_4<160°$, an angle formed by the seventh or eighth rotation axis and the horizontal surface of the fuselage is angle $a_4$, $1°<a_4<86°$ or $-86°<a_4<-1°$, wherein $a_4$ and $a_1$ have the same plus or minus sign, and meanwhile, a projection line of the seventh or eighth rotation axis on the horizontal surface of the fuselage and the direction of the axis extending outward the fuselage form an angle $b_4$, $90°<b_4<150°$.

More preferably, in the unmanned helicopter, a length direction of any arm of the first group of two arms and its corresponding first or second rotation axis form an angle $r_1$, $68°<r_1<76°$, an angle formed by the first or second rotation axis and the horizontal surface of the fuselage is angle $a_1$, $21°<a_1<29°$, and meanwhile, a projection line of the first or second rotation axis on the horizontal surface of the fuselage and the direction of the axis extending outward the fuselage form an angle $b_1$, $55°<b_1<63°$, a length direction of any arm of the second group of two arms and its corresponding third or fourth rotation axis form an angle $r_2$, $50°<r_2<58°$, an angle formed by the third or fourth rotation axis and the horizontal surface of the fuselage is angle $a_2$, $15°<a_2<23°$, and meanwhile, a projection line of the third or fourth rotation axis on the horizontal surface of the fuselage and the direction of the axis extending outward the fuselage form an angle $b_2$, $49°<b_2<57°$;

a length direction of any arm of the third group of two arms and its corresponding fifth or sixth rotation axis form an angle $r_3$, $122°<r_3<130°$, an angle formed by the fifth or sixth rotation axis and the horizontal surface of the fuselage is angle $a_3$, $27°<a_3<35°$, and meanwhile, a projection line of the fifth or sixth rotation axis on the horizontal surface of the fuselage and the direction of the axis extending outward the fuselage form an angle $b_3$, $123°<b_3<131°$;

a length direction of any arm of the fourth group of two arms and its corresponding fifth or sixth rotation axis form an angle $r_4$, $97°<r_4<105°$, an angle formed by the seventh or eighth rotation axis and the horizontal surface of the fuselage is angle $a_4$, $22°<a_4<30°$, and meanwhile, a projection line of the seventh or eighth rotation axis on the horizontal surface of the fuselage and the direction of the axis extending outward the fuselage form an angle $b_4$, $114°<b_4<122°$.

More preferably, in the unmanned helicopter, a length direction of any arm of the first group of two arms and its corresponding first or second rotation axis form an angle $r_1$, $70°<r_1<74°$, an angle formed by the first or second rotation axis and the horizontal surface of the fuselage is angle $a_1$, $23°<a_1<27°$, and meanwhile, a projection line of the first or second rotation axis on the horizontal surface of the fuselage and the direction of the axis extending outward the fuselage form an angle $b_1$, $57°<b_1<61°$, a length direction of any arm of the second group of two arms and its corresponding third or fourth rotation axis form an angle $r_2$, $52°<r_2<56°$, an angle formed by the third or fourth rotation axis and the horizontal surface of the fuselage is angle $a_2$, $17°<a_2<21°$, and meanwhile, a projection line of the third or fourth rotation axis on the horizontal surface of the fuselage and the direction of the axis extending outward the fuselage form an angle $b_2$, $51°<b_2<55°$;

a length direction of any arm of the third group of two arms and its corresponding fifth or sixth rotation axis form an angle $r_3$, $124°<r_3<128°$, an angle formed by the fifth or sixth rotation axis and the horizontal surface of the fuselage is angle $a_3$, $29°<a_3<33°$, and meanwhile, a projection line of the fifth or sixth rotation axis on the horizontal surface of the fuselage and the direction of the axis extending outward the fuselage form an angle $b_3$, $125°<b_3<129°$;

a length direction of any arm of the fourth group of two arms and its corresponding seventh or eighth rotation axis form an angle $r_4$, $99°<r_4<103°$, an angle formed by the seventh or eighth rotation axis and the horizontal surface of the fuselage is angle $a_4$, $24°<a_4<28°$, and meanwhile, a projection line of the seventh or eighth rotation axis on the horizontal surface of the fuselage and the direction of the axis extending outward the fuselage form an angle $b_4$, $116°<b_4<120°$.

More preferably, in the unmanned helicopter, a length direction of any arm of the first group of two arms and its corresponding first or second rotation axis form an angle $r_1$, $71°<r_1<72°$, an angle formed by the first or second rotation axis and the horizontal surface of the fuselage is angle $a_1$, $25°<a_1<26°$, and meanwhile, a projection line of the first or second rotation axis on the horizontal surface of the fuselage and the direction of the axis extending outward the fuselage form an angle $b_1$, $58°<b_1<59°$, a length direction of any arm of the second group of two arms and its corresponding third or fourth rotation axis form an angle $r_2$, $53°<r_2<54°$, an angle formed by the third or fourth rotation axis and the horizontal surface of the fuselage is angle $a_2$, $18°<a_2<19°$, and meanwhile, a projection line of the third or fourth rotation axis on the horizontal surface of the fuselage and the direction of the axis extending outward the fuselage form an angle $b_2$, $53°<b_2<54°$;

a length direction of any arm of the third group of two arms and its corresponding fifth or sixth rotation axis form an angle $r_3$, $126°<r_3<127°$, an angle formed by the fifth or sixth rotation axis and the horizontal surface of the fuselage is angle $a_3$, $31°<a_3<32°$, and meanwhile, a projection line of the fifth or sixth rotation axis on the horizontal surface of the fuselage and the direction of the axis extending outward the fuselage form an angle $b_3$, $126°<b_3<127°$;

a length direction of any arm of the fourth group of two arms and its corresponding fifth or sixth rotation axis form an angle $r_4$, $100°<r_4<101°$, an angle formed by the seventh or eighth rotation axis and the horizontal surface of the fuselage is angle $a_4$, $25°<a_4<26°$, and meanwhile, a projection line of the seventh or eighth rotation axis on the horizontal surface of the fuselage and the direction of the axis extending outward the fuselage form an angle $b_4$, $117°<b_4<118°$.

More preferably, in the unmanned helicopter, the first group of two arms and the second group of two arms have the same folding direction upon folding and stowing, and both face towards a direction of the axis of the fuselage; the third group of two arms and the fourth group of two arms have the same folding direction upon folding and stowing, and both face towards an opposite direction of the axis of the fuselage.

More preferably, in the unmanned helicopter, the fuselage and each of said arms employ therebetween a movable connection which is articulation, wherein a first or second articulation axis at the ends of the first group of two arms connected with the fuselage is respectively the corresponding first or second rotation axis; a third or fourth articulation axis at the ends of the second group of two arms connected with the fuselage is respectively the corresponding third or fourth rotation axis; a fifth or sixth articulation axis at the ends of the third group of two arms connected with the fuselage is respectively the corresponding fifth or sixth rotation axis; a seventh or eighth articulation axis at the ends of the fourth group of two arms connected with the fuselage is respectively the corresponding seventh or eighth rotation axis.

More preferably, in the unmanned helicopter, an end of each of the eight arms connected with the fuselage is provided with a lug, the fuselage is correspondingly provided with eight protrusions, wherein the eight lugs form articulation with the eight protrusions respectively.

More preferably, in the unmanned helicopter, each of said lugs is provided with a lug through hole, each of said protrusions corresponding thereto is provided with a protrusion through hole, and each pin passes through each of said lug through hole and the corresponding protrusion through hole to form articulation.

More preferably, in the unmanned helicopter, when the eight arms all respectively rotate to get into a folded state, as viewed from the angle of top view, the other ends of the first group of two arms for arranging rotors having motors and the lugs at the ends of the first group connected with the fuselage can respectively be located on both sides of the protrusions of the third group located on the same side of the fuselage, the other ends of the second group of two arms for arranging rotors having motors and the lugs at the ends of the second group connected with the fuselage can respectively be located on both sides of the protrusions of the fourth group located on the same side of the fuselage, at the same time, when the eight arms all respectively rotate to get into the folded state, as viewed from the angle of top view, the other ends of the third group of two arms for arranging rotors having motors and the lugs at the ends of the third group connected with the fuselage can respectively be located on both sides of the protrusions of the second group located on the same side of the fuselage, the other ends of the fourth group of two arms for arranging rotors having motors and the lugs at the ends of the fourth group connected with the fuselage can respectively be located on both sides of the protrusions of the second group located on the same side of the fuselage.

More preferably, in the unmanned helicopter, the rotors are detachable, and the eight arms in the folded state carry or do not carry the rotors.

The eight-arm unmanned helicopter achieves the following advantageous effects: as observed in the three directions, namely, the fuselage vertical height direction, the fuselage length direction and the fuselage width direction, it can be appreciated that in the three-dimensional space of the present disclosure, the folded and stowed state makes full use of the space so that the folded and stowed state is very compact. This derives from the smart angle setting of the respective rotation axes of the eight arms in the present disclosure, namely, selection of their respective angle r, angle a and angle b. Meanwhile, the above single degree of freedom design substantially increases reliability of system connection so that the service life of the unmanned helicopter is substantially prolonged.

BRIEF DESCRIPTION OF DRAWINGS

FIG. 3A is a top view of an unmanned helicopter employing arms which are foldable in the same direction when the arms are in a deployed state in the prior art.

FIG. 3B is a top view of an unmanned helicopter employing arms which are foldable in the same direction when the arms are folded horizontally in the same direction in the prior art.

FIG. 3C is a top view of an unmanned helicopter employing arms which are foldable in the same direction when the arms are folded vertically in the same direction in the prior art.

FIG. 4A is a perspective view of a four-arm unmanned helicopter when the arms are deployed according to the present disclosure.

FIG. 4B is exploded.

FIG. 4B is exploded.

DETAILED DESCRIPTION

Figure 1A:
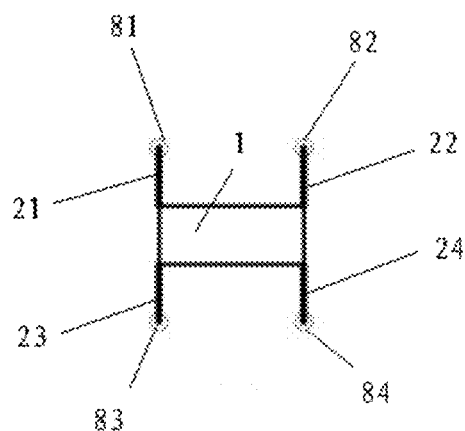
FIG. 1A is a top view of an unmanned helicopter employing arms which are non-overlappablely foldable in opposed directions when the arms are in a deployed state in the prior art.
Figure 1B:
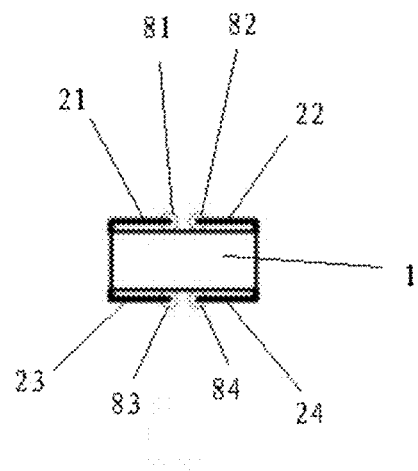
FIG. 1B is a top view of an unmanned helicopter employing arms which are non-overlappablely foldable in opposed directions when the arms are in a folded state in the prior art.
Figure 2A:
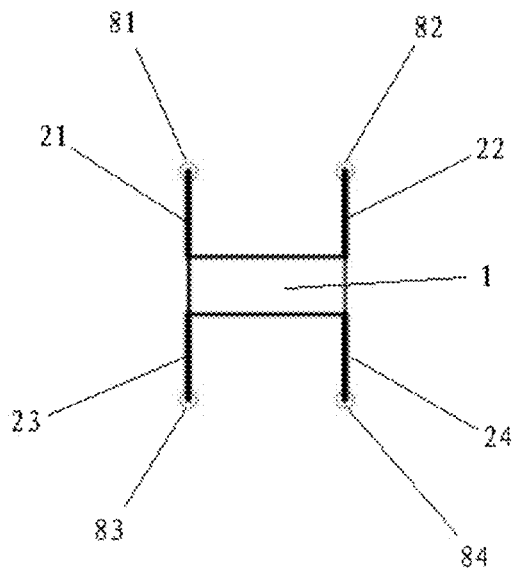
FIG. 2A is a top view of an unmanned helicopter employing arms which are overlappablely foldable in opposed directions when the arms are in a deployed state in the prior art.
Figure 2B:
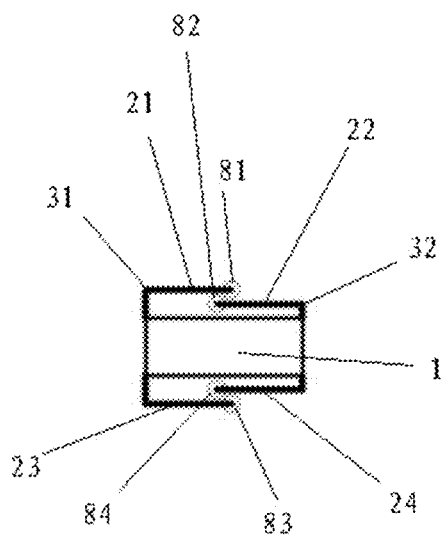
FIG. 2B is a top view of an unmanned helicopter employing arms which are overlappablely foldable in opposed directions when the arms are in a folded state in the prior art.

Specific embodiments of the present disclosure will be described with reference to figures, including three preferred embodiments: a four-arm unmanned helicopter, a six-arm unmanned helicopter and an eight-arm unmanned helicopter respectively.

For ease of description, orientations such as up, down, left and right in the figures are all directly used in the following specific depictions and used to indicate locations of components in the figures. Such depictions of orientations are not restrictive.

Embodiment 1: A Four-Arm Unmanned Helicopter

FIG. 4A shows a preferred embodiment of a four-arm unmanned helicopter when the arms are in a deployed state according to the present disclosure. Correspondingly, as can be seen from the top view in FIG. 5A, the unmanned helicopter is left-right symmetrical relative to an axis 4 of the fuselage. In FIG. 5A, a middle portion is a fuselage 1, a left upper portion thereof is a first arm 21, a right upper portion thereof is a second arm 22, the first arm 21 and second arm 22 jointly form a first group of arms, and in the front view of FIG. 6A, the first group of arms are located in the rear of FIG. 6A, and therefore also called a rear group of arms; its left lower portion is a third arm 23, a right lower portion is a fourth arm 24, the third arm 23 and fourth arm 24 jointly form a second group of arms, and in the front view of FIG. 6A, the second group of arms are located in the front of FIG. 6A, and therefore also called a front group of arms.

In FIG. 4A, a rectangular coordinate system X'Y'Z' is established, wherein Y' is a direction along an axis 4 of the fuselage, Z' is a vertical direction, and X' direction may be solely determined by using a right-hand rule after the directions of Y' and Z' are both determined. The coordinate system X'Y'Z' is a right-hand rectangular coordinate system.

Figure 4B:
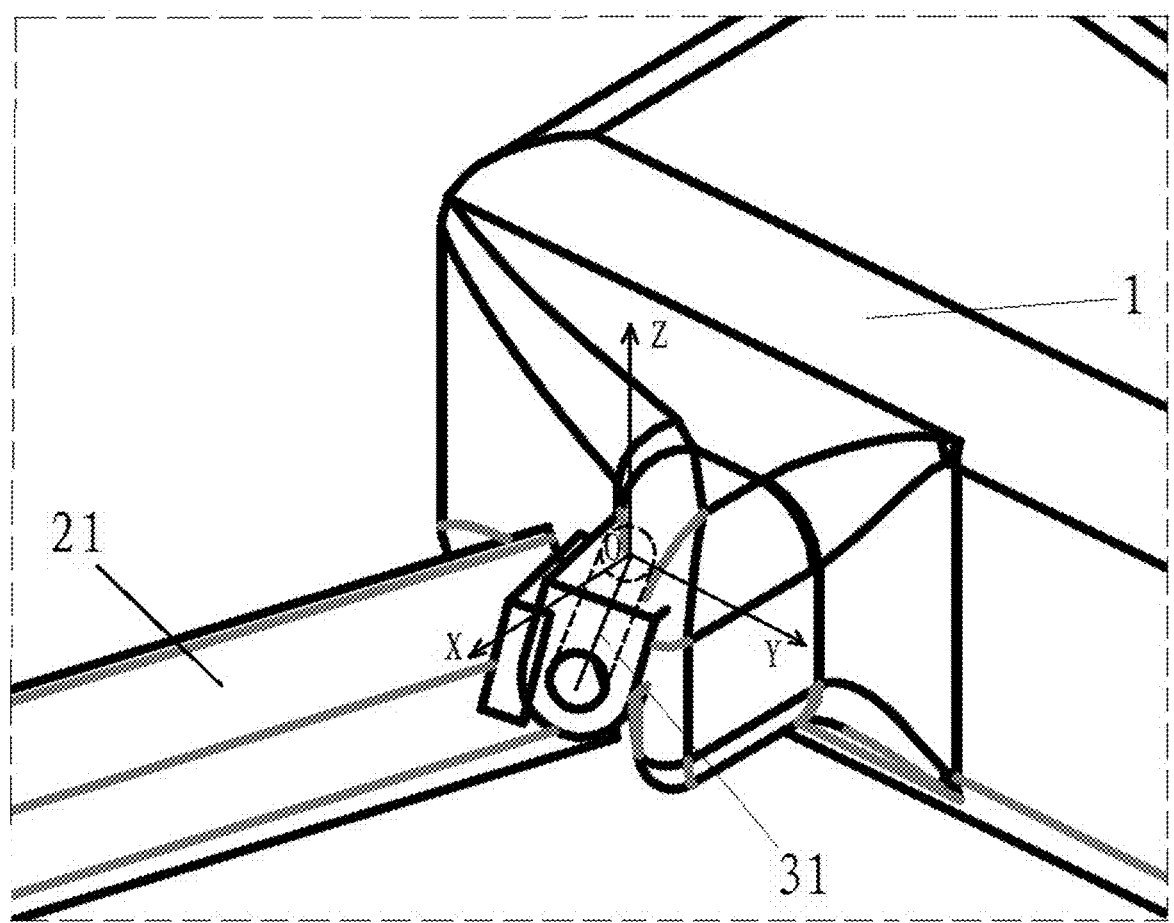
FIG. 4B is a partially enlarged view of portion G of FIG. 4A.
Figure 5A:
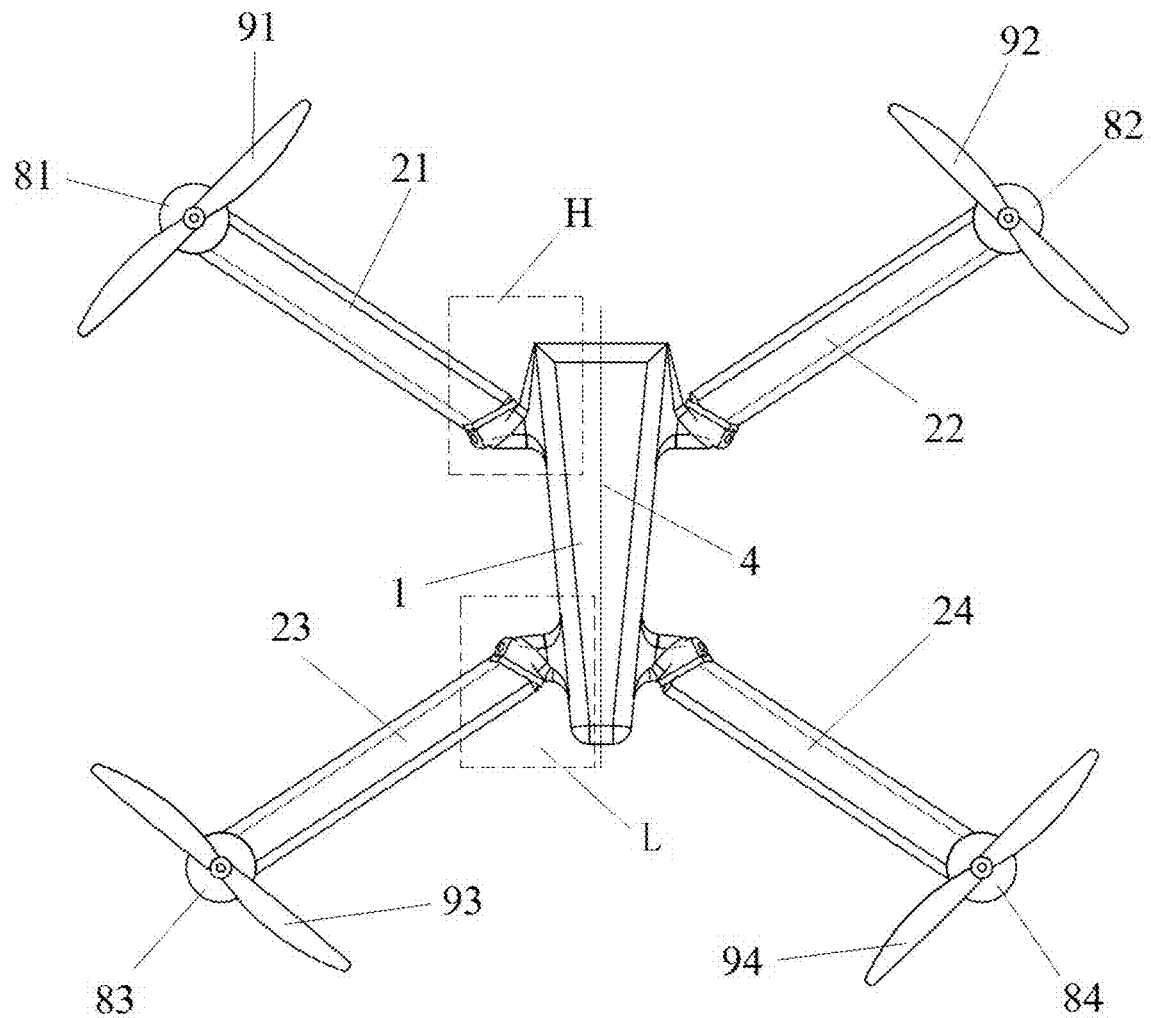
FIG. 5A is a top view of a four-arm unmanned helicopter when the arms are deployed according to the present disclosure.

In the first group of arms shown in FIG. 4A, since the first arm 21 and second arm 22 are symmetrical relative to the axis of the fuselage, a portion where the first arm 21 is connected with the fuselage 1 is described in detail, namely, description is presented according to FIG. 4B which is a partially enlarged view of portion G of FIG. 4A. In FIG. 4B, the established rectangular coordinate system X-Y-Z is obtained by translating the aforesaid rectangular coordinate system X'Y'Z', wherein X is parallel to X', Y is parallel to Y', Z is parallel to Z', and an origin O of the coordinate system X-Y-Z is located on a first rotation axis 31. At this time, since the first arm 21 and the fuselage 1 are in a mutually-articulated relationship, the first arm 21 can rotate about the first rotation axis 31, so the first rotation axis is a first articulation axis.

In the preferred embodiment shown in FIG. 4B, the first arm 21 and the fuselage 1 are articulated to each other, due to limitations of the perspective view itself, it is difficult to directly observe detailed situations of the articulated position. To better illustrate the mutually-articulated relationship between the first arm 21 and the fuselage 1, the first arm 21 in FIG. 4B is exploded and shown in FIG. 4C, and fuselage 1 of FIG. 4B is exploded and shown in FIG. 4D.

Figure 4C:
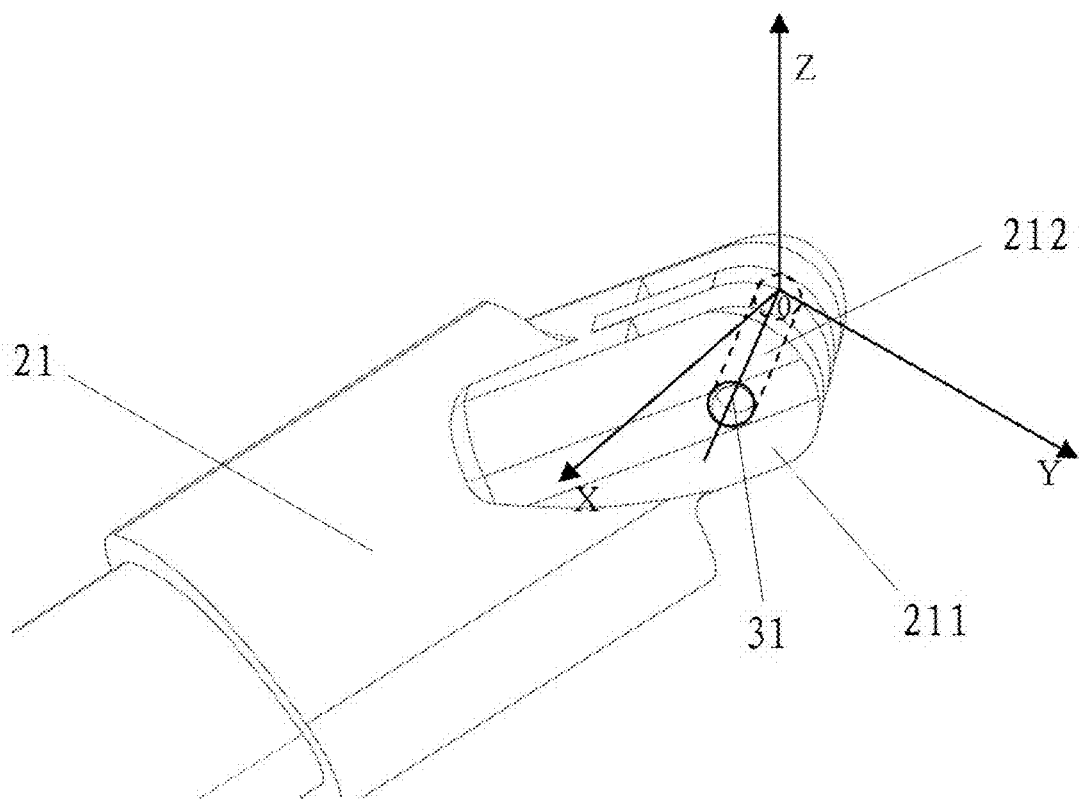
FIG. 4C is a portion of a first arm after
Figure 5B:
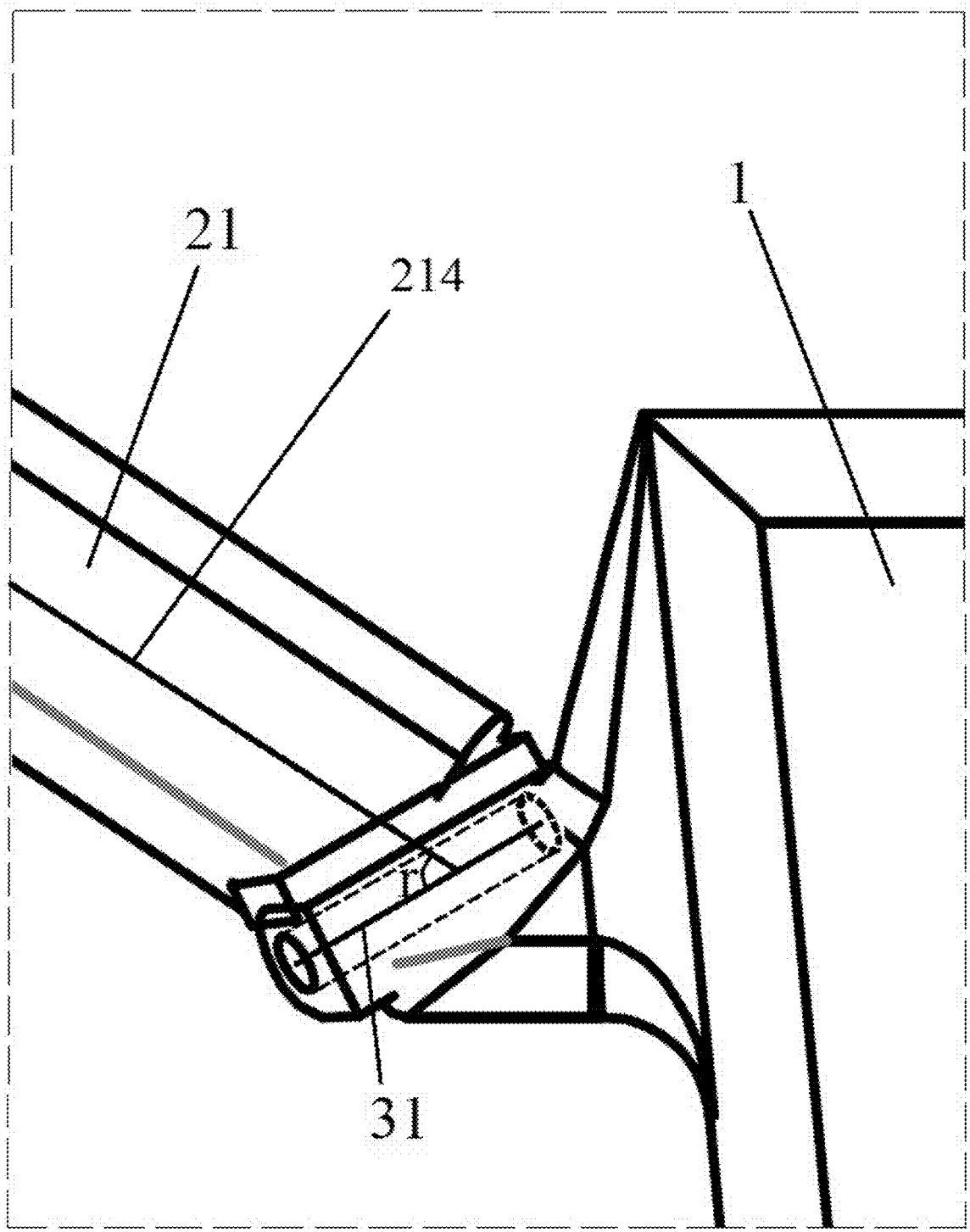
FIG. 5B is a partially enlarged view of portion H of FIG. 5A.

In FIG. 4C, an end of the first arm 21 connected with the fuselage 1 is provided with a lug 211, and the lug 211 is provided with a lug through hole 212. The lug through hole 212 may be a continuous through hole, or may be formed jointly by several through holes in the same first rotation axis 31. The lug through hole 212 in FIG. 4C is jointly formed by two through holes in the same first rotation axis 31. The rectangular coordinate system X-Y-Z established in FIG. 4C and the rectangular coordinate system established in FIG. 4B are the same rectangular coordinate system, and the origin O of the coordinate system X-Y-Z is located on the first rotation axis 31 (namely, the first articulation axis). At this time, as shown in FIG. 5B, an angle between a length direction 214 of the first arm 21 and the first rotation axis 31 is angler, most generally, 20°<r<90, generally 72°<r<80°, preferably 74°<r<78°, most preferably 75°<r<76°, for example r=75.71°

Figure 4D:
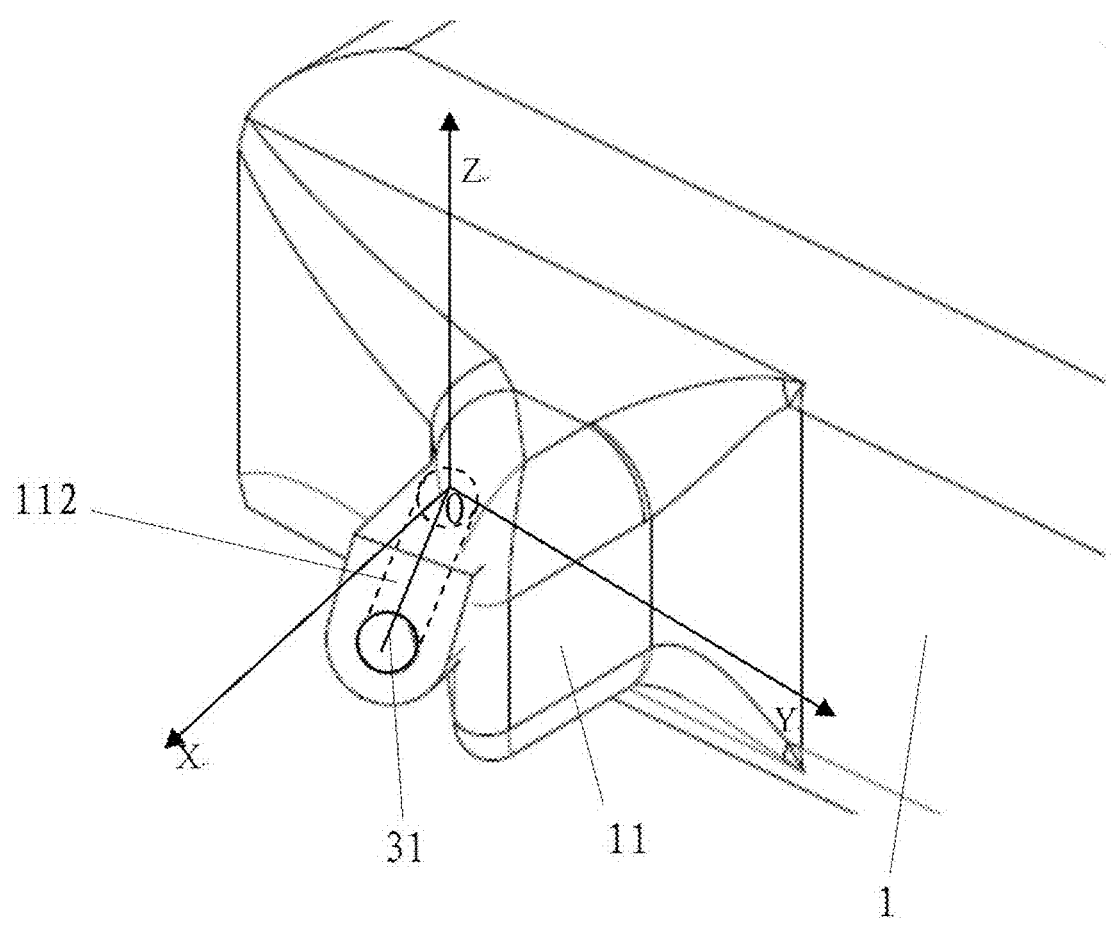
FIG. 4D is a portion of a fuselage after

In FIG. 4D, corresponding to the location of the lug through hole 212 of the lug 211, the fuselage 1 is provided with a protrusion 11. A protrusion through hole 112 is disposed in the protrusion 11. The rectangular coordinate system X-Y-Z established in FIG. 4D and the rectangular coordinate system established in FIG. 4B are the same rectangular coordinate system, and the origin O of the coordinate system X-Y-Z is located on the first rotation axis 31 (namely, the first articulation axis).

In conjunction with FIG. 4C and FIG. 4D, an axis of the lug through hole 212 of the lug 211 in FIG. 4C is aligned with an axis of the protrusion through hole 112 of the protrusion 11 of FIG. 4D, that is, the two axes are both the first rotation axis 31 (namely, the first articulation axis). A pin (not shown) adapted in size is provided along the first rotation axis 31, thereby reliably achieving the articulation of the lug 211 of the first arm 21 and the protrusion 11 of the fuselage 1, namely forming the articulation of the first arm 21 and fuselage 1 shown in FIG. 4B. So far, when the fuselage is kept stationary, the first arm 21 may rotate about the first rotation axis 31 (namely, the first articulation axis), namely, the first rotation axis 31 rotates from a deployed state to a folded and stowed state. Likewise, the second arm 22, third arm 23 and fourth arm 24 may also rotate their respective second rotation axis 32, third rotation axis 33 and fourth rotation axis 34 to a folded and stowed state.

Here it needs to be appreciated that there are many manners of achieving the articulation of the first arm 21 and the fuselage 1, and there are also many manners of achieving movable connection of the first arm 21 and fuselage 1. Those skilled in the art can understand various movable connection manners which are substantively equivalent to the present preferred embodiment all fall within the extent of protection of the present disclosure.

Figure 4E:
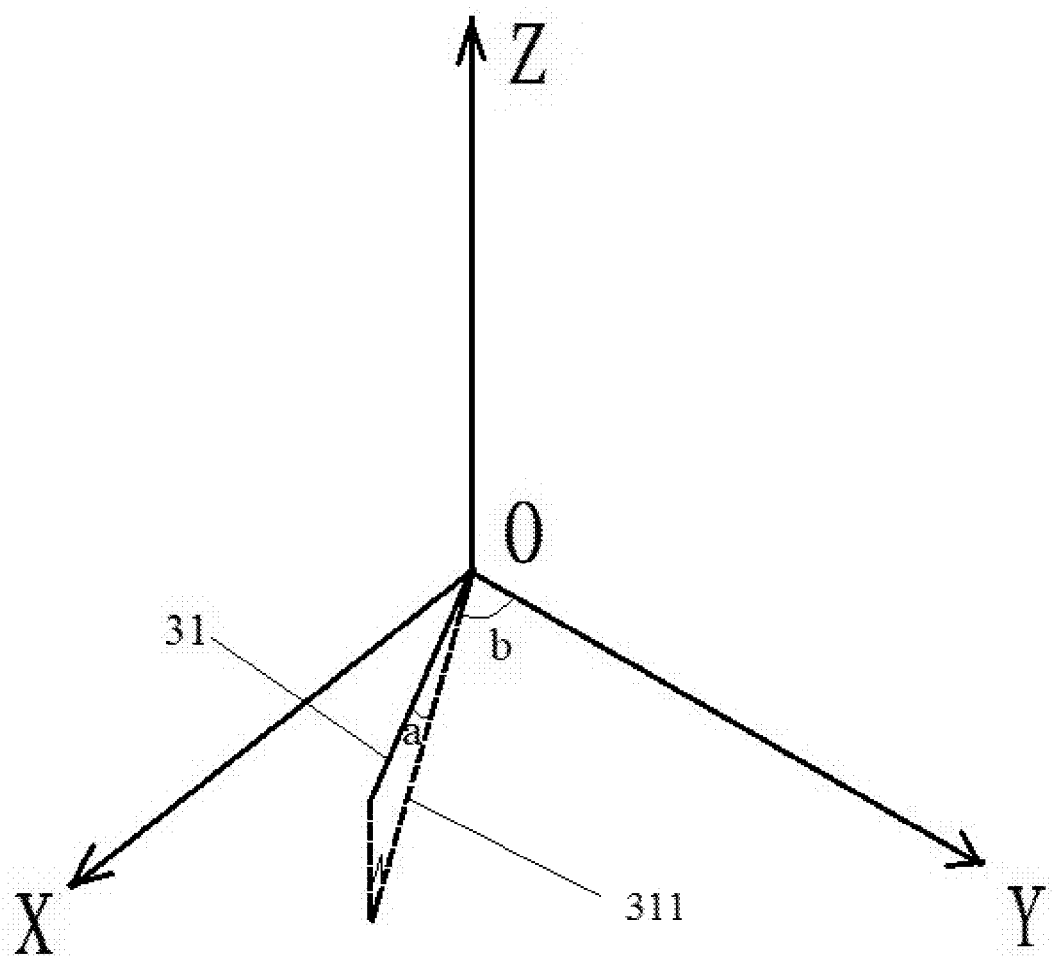
FIG. 4E is a schematic diagram of a specific location of a rotation axis in FIG. 4B in a X-Y-Z coordinate system.

In the present disclosure, the direction of disposing the pin, namely, the axis direction of the first rotation shaft 31 is designed very smart and will be detailed hereunder. Since the rectangular coordinate system X-Y-Z in FIG. 4B, FIG. 4C and FIG. 4D is coincident, as shown in FIG. 4E, the rectangular coordinate system X-Y-Z in FIG. 4B is presented individually to facilitate clear description of selection of the angle of the first rotation axis 31. The first rotation axis 31 and a horizontal plane XOY form an angle a, most generally, 1°<a<86° or −86°<a<−1°, generally, 23°<a<31°, preferably 25°<a<29°, most preferably 26°<a<27°, for example a=26.69°, wherein the value of angle a may be selected as positive or negative. All the values of angle a subsequently appearing in the description may be selected as positive or negative, and will not be detailed one by one for the sake of brevity. At the same time, the first rotation axis 31 forms a first rotation axis projection line 311 in the horizontal plane XOY, and the first rotation axis projection line 311 and the fuselage axis 4 direction (namely, Y-axis direction) form an angle b which is most generally 30°<b<90°, generally 43°<b<51°, preferably 45°<b<49°, most preferably 47°<b<48°, for example b=47.28°.

The second arm 22 and the first arm 21 are symmetrical relative to the fuselage axis 4, so the articulation manner of the second arm 22 and the fuselage 1 is mirror symmetrical with the articulation manner of the first arm 21 and fuselage 1 described here. Since the first arm 21 and second arm 22 jointly form a first group of arms, subscript 1 is added to the above angle r, angle a and angle b, and angle $r_1$, angle $a_1$ and angle $b_1$ represent three angle parameters of the first group of arms.

On the same principle of the articulation manner of the first arm 21 and the fuselage 1, and the articulation manner of the second arm 22 and the fuselage 1, in the preferred embodiment the third arm 23 and the fuselage 1 also employ the articulation manner, and the fourth arm 24 and the fuselage 1 also employ the articulation manner.

Figure 4F:
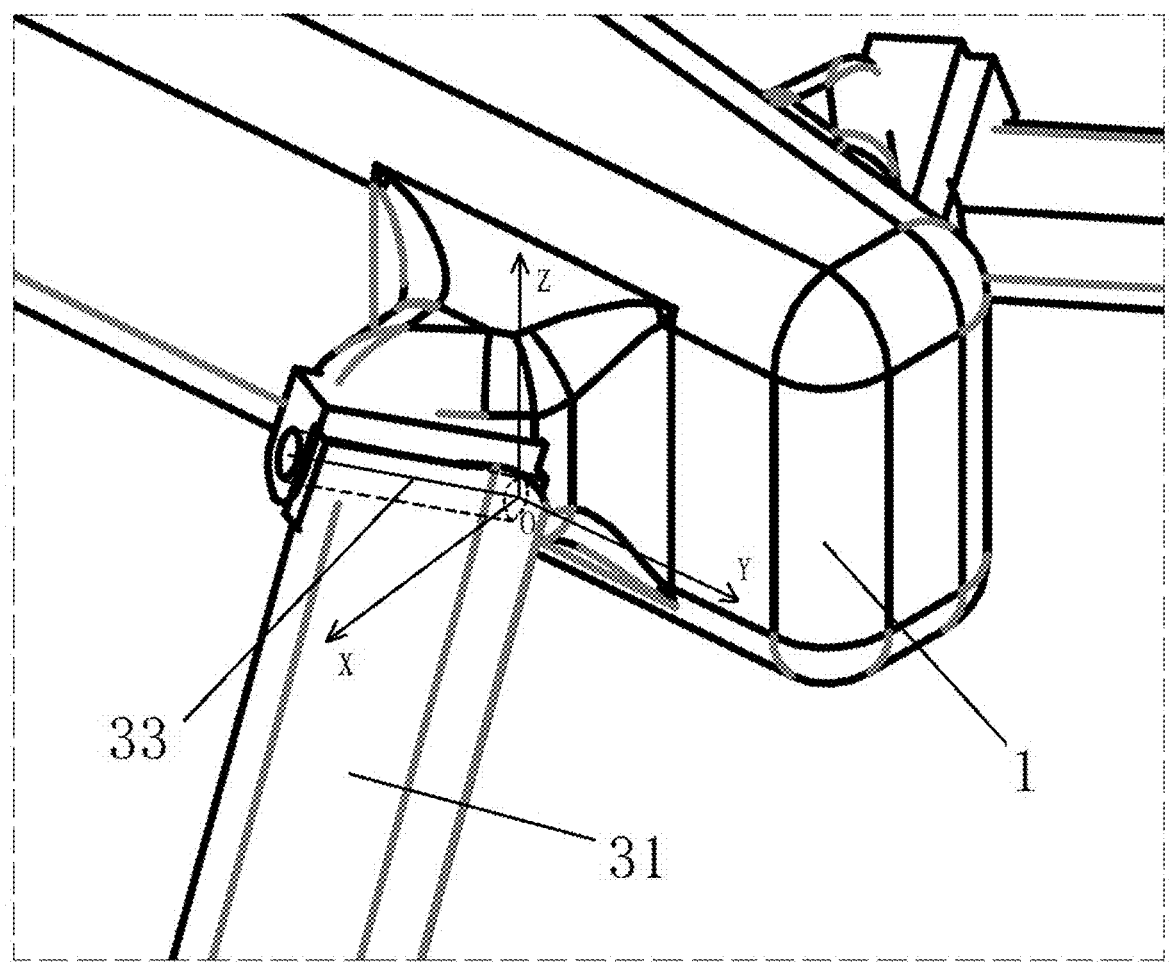
FIG. 4F is a partially enlarged view of portion K of FIG. 4A.

In the second group of arms shown in FIG. 4A, the third arm 23 and second arm 24 are symmetrical relative to the axis of the fuselage, so a portion where the third arm 23 is connected with the fuselage 1 is described in detail, namely, described according to FIG. 4F which is a partially enlarged view of portion K of FIG. 4A. In FIG. 4F, the established rectangular coordinate system X-Y-Z is obtained by translating the rectangular coordinate system X'Y'Z', wherein X is parallel to X', Y is parallel to Y', Z is parallel to Z', and an origin O of the coordinate axes X-Y-Z is located on a third rotation axis 33. At this time, since the third arm 23 and the fuselage 1 are in a mutually-articulated relationship, the third arm 23 can rotate about the third rotation axis 33, so the third rotation axis is a third articulation axis.

Figure 4G:
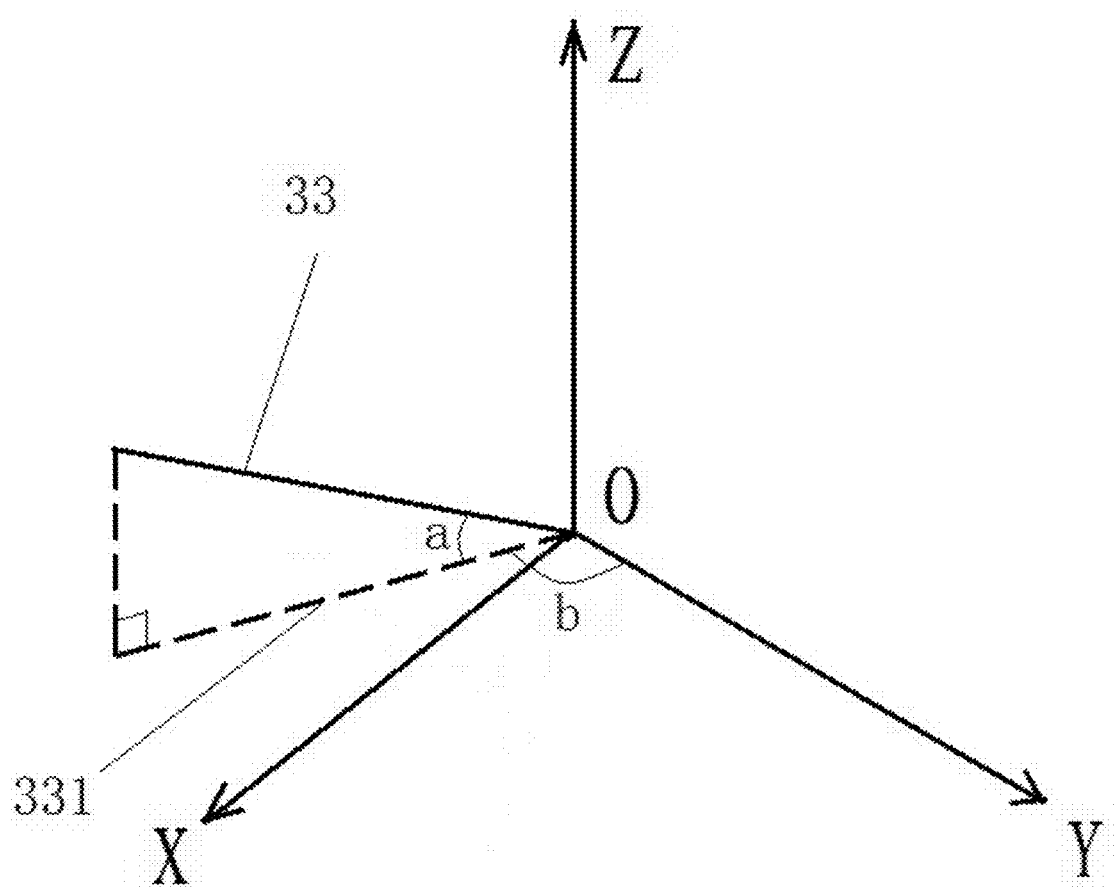
FIG. 4G is a schematic diagram of a specific location of a rotation axis in FIG. 4F in a X-Y-Z coordinate system.
Figure 5C:
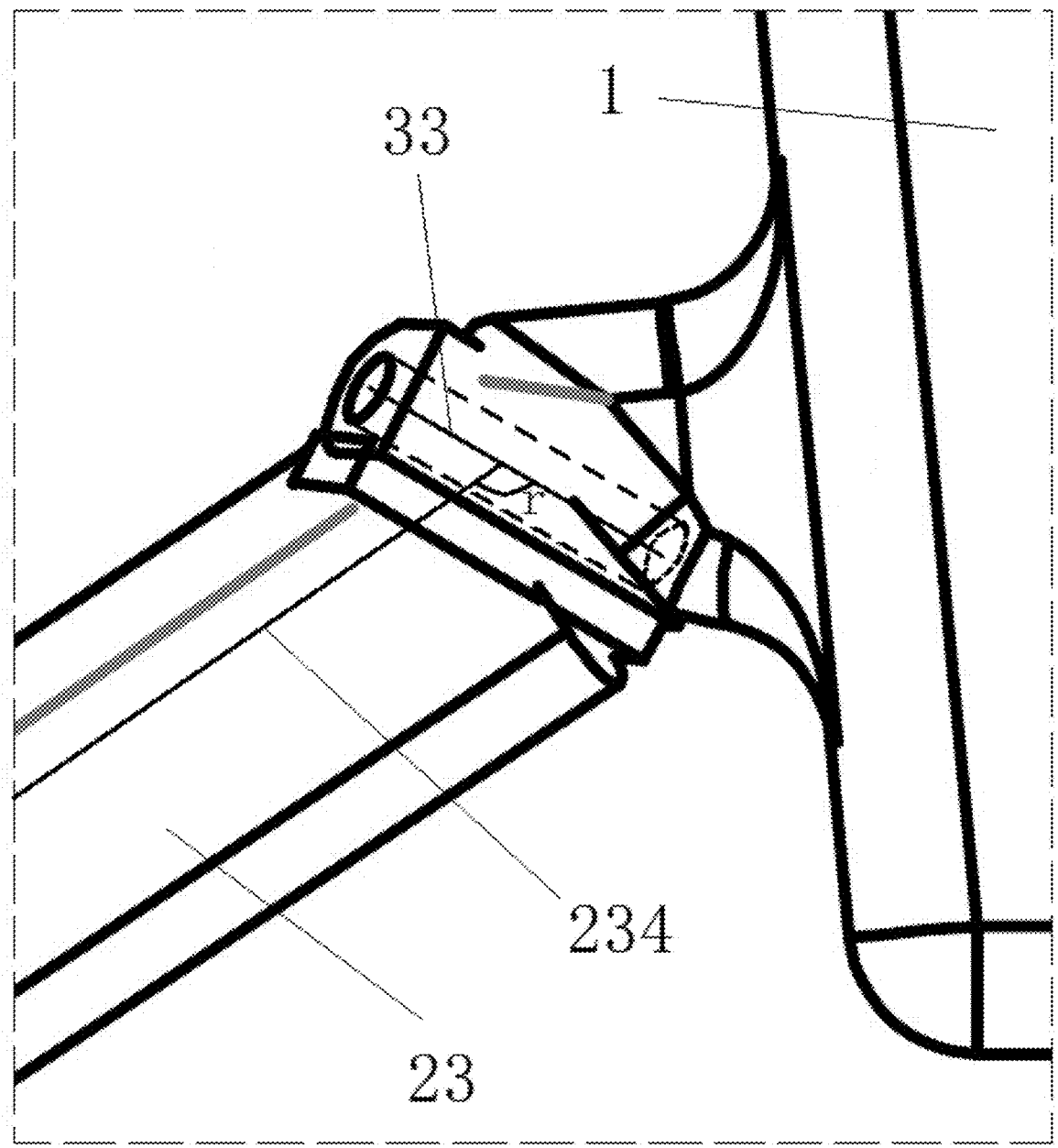
FIG. 5C is a partially enlarged view of portion L of FIG. 5A.

In FIG. 4F, the articulated connection of the third arm 23 and the fuselage 1 is similar to the articulated connection of the first arm 21 and the fuselage 1 in FIG. 4B in arrangement, those skilled in the art can clearly understand the articulation structure of the lug through hole of the third arm 23 and the corresponding protrusion of the fuselage 1. The angle of the third rotation axis (namely, the third articulation axis) needs to be described specifically here. As shown in FIG. 4G, the rectangular coordinate system X-Y-Z in FIG. 4F is presented individually to facilitate clear description of selection of the angle of the third rotation axis 33. The third rotation axis 32 and a horizontal plane XOY form an angle a, most generally, 1°<a<86° or −86°<a<−1°, generally 23°<a<31°, preferably, 25°<a<29°, most preferably 26°<a<27°, for example, a=26.69°. At the same time, the third rotation axis 33 forms a third rotation axis projection line 331 in the horizontal plane XOY, and the third rotation axis projection line 331 and the fuselage axis 4 direction (namely, Y-axis direction) form an angle b which is an obtuse angle as can be seen from FIG. 4F, most generally 90°<b<150°, generally 115°<b<123°, preferably 117°<b<121°, most preferably 119°<b<120°, for example b=119.42°. At the same time, as the length direction of the first arm 21 has an angle with its first rotation axis 31 in FIG. 5B, the length direction of the third arm 23 or fourth arm 24 has an angle with its respective rotation axis. Specifically, FIG. 5C is a partially enlarged view of portion L of FIG. 5A. The third arm 23 is taken as an example. An angle between the length direction of the third arm 23 and the third rotation axis 33 is angle r. As can be seen from the figure, at this time r is an obtuse angle, most generally 90°<r<160°, generally 114°<r<122°, preferably 116°<r<120°, most preferably 117°<r<118°, for example r=117.79°. The fourth arm 24 and the third arm 23 are symmetrical relative to the fuselage axis 4, so the articulation manner of the fourth arm 24 and the fuselage 1 is mirror symmetrical with the articulation manner of the third arm 23 and fuselage 1 described here. Since the third arm 23 and fourth arm 24 jointly form a second group of arms, subscript 2 is added to the above angle r, angle a and angle b, and angle $r_2$, angle $a_2$ and angle $b_2$ represent three angle parameters of the second group of arms.

Figure 6A:
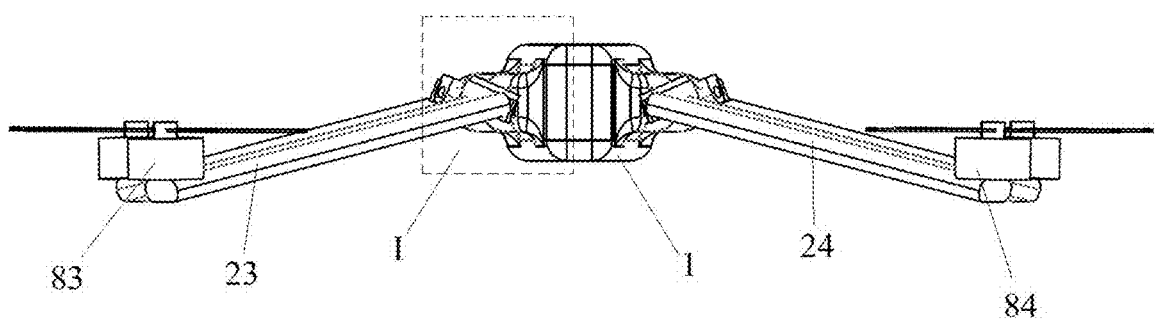
FIG. 6A is a front view of a four-arm unmanned helicopter when the arms are deployed according to the present disclosure.
Figure 6B:
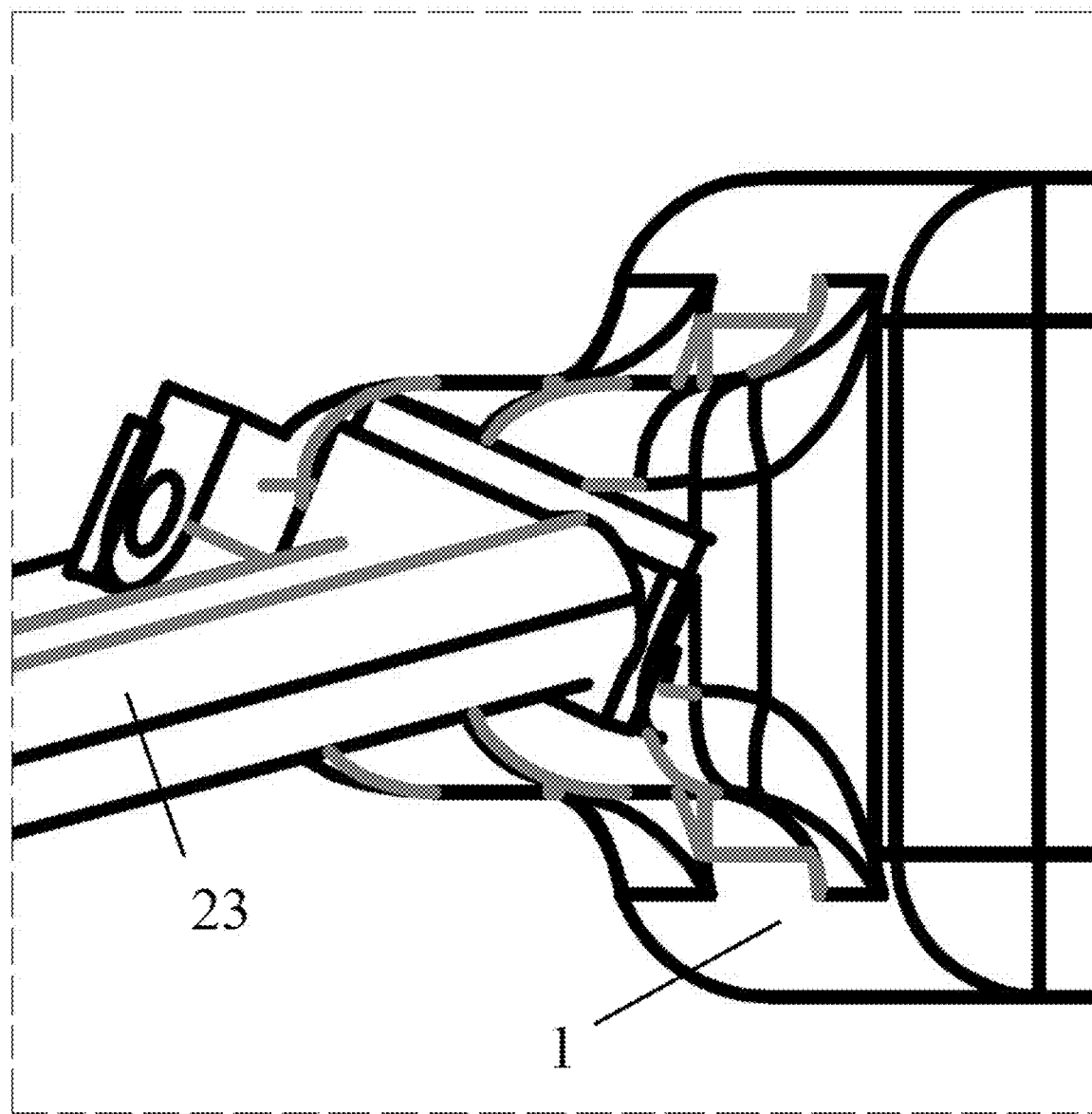
FIG. 6B is a partially enlarged view of portion I of FIG. 6A.
Figure 7A:
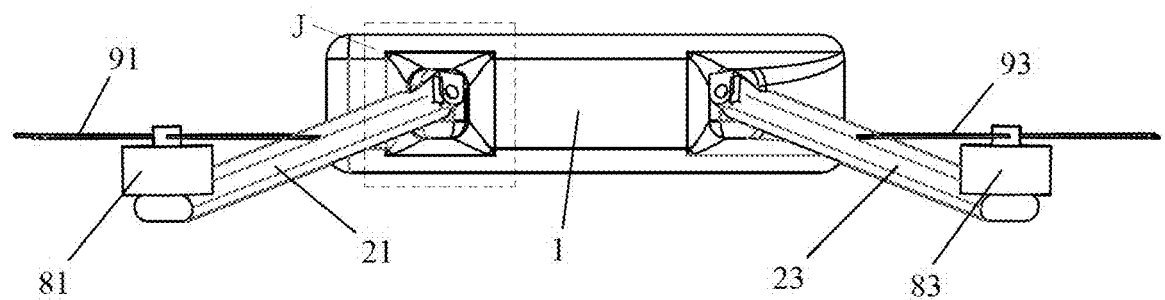
FIG. 7A is a side view of a four-arm unmanned helicopter when the arms are deployed according to the present disclosure.
Figure 7B:
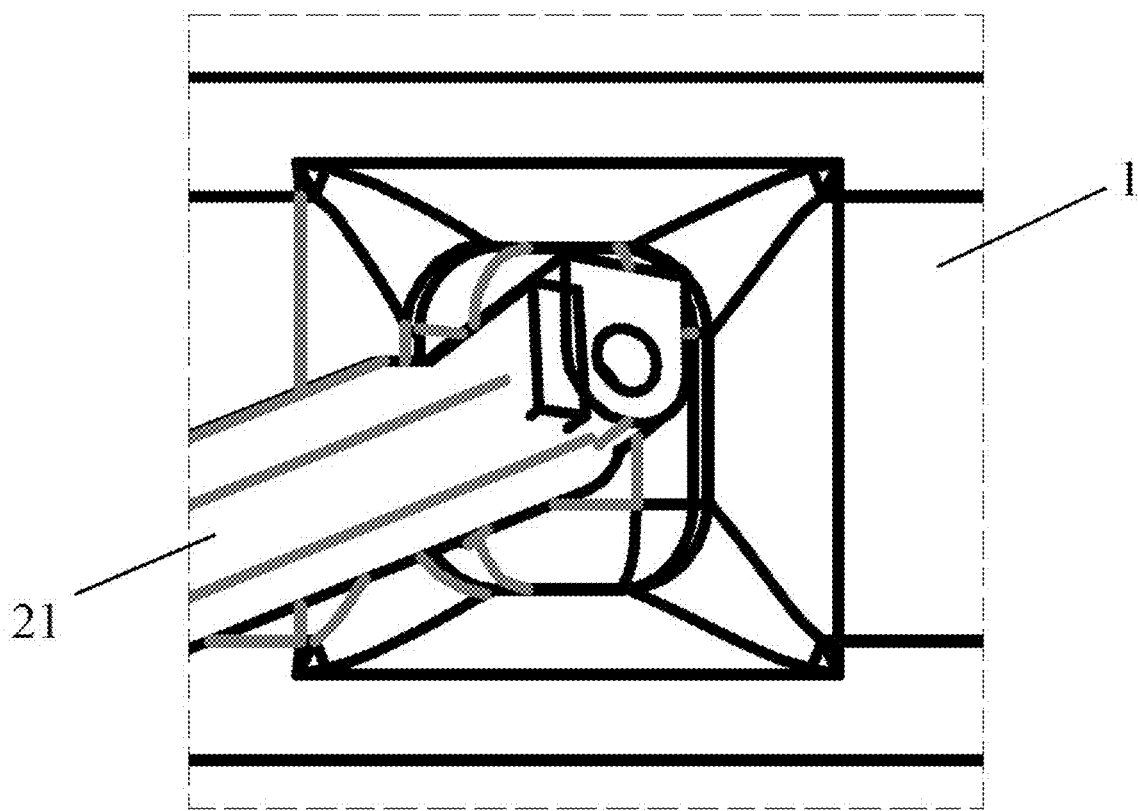
FIG. 7B is a partially enlarged view of portion J of FIG. 7A.
Figure 8:
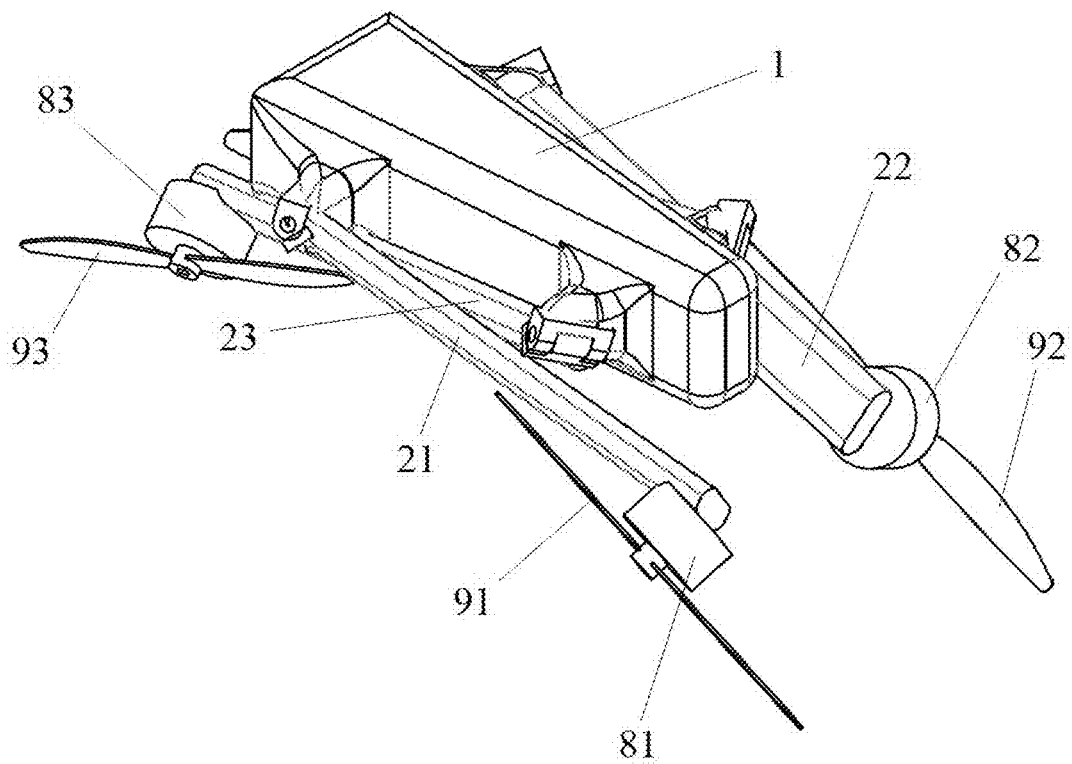
FIG. 8 is a perspective view of a four-arm unmanned helicopter when the arms are folded and stowed according to the present disclosure.
Figure 9:
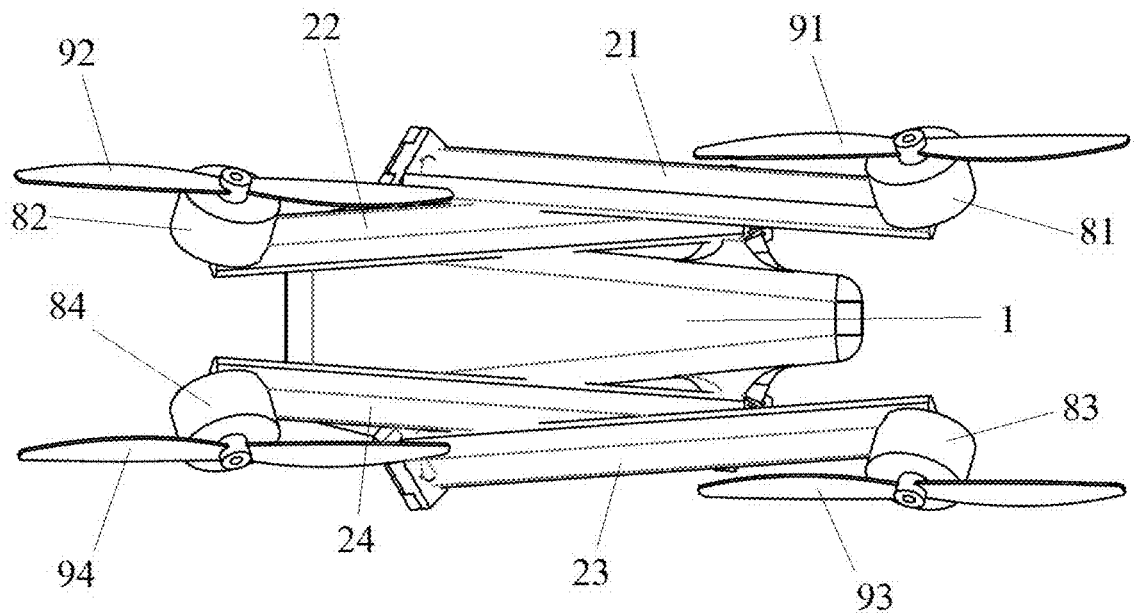
FIG. 9 is a bottom view of a four-arm unmanned helicopter when the arms are folded and stowed according to the present disclosure.
Figure 10:
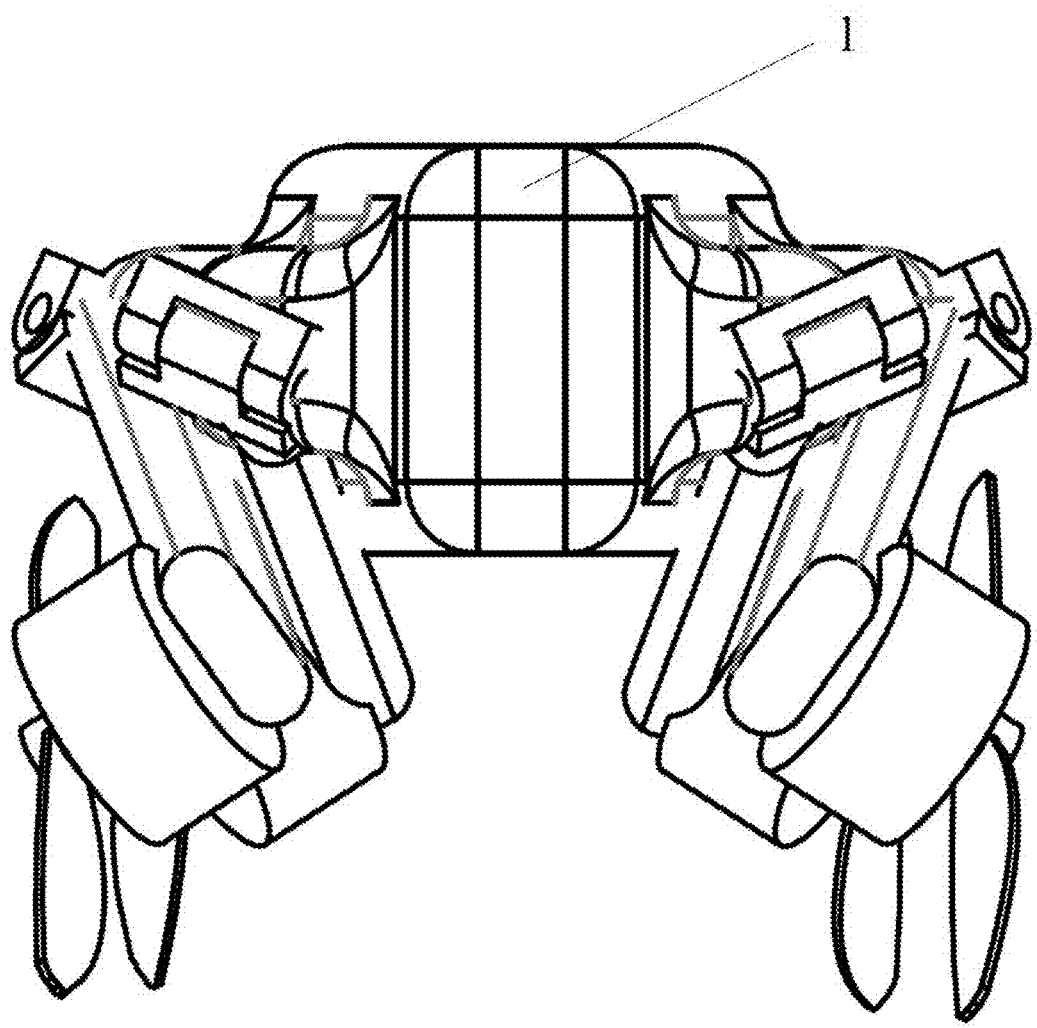
FIG. 10 is a front view of a four-arm unmanned helicopter when the arms are folded and stowed according to the present disclosure.
Figure 11:
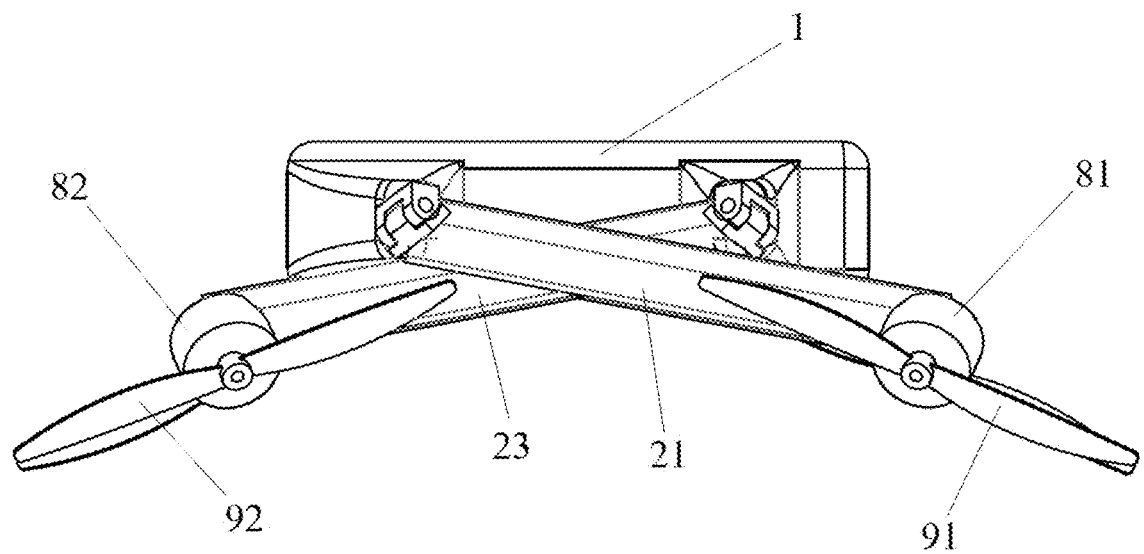
FIG. 11 is a side view of a four-arm unmanned helicopter when the arms are folded and stowed according to the present disclosure.
Figure 12:
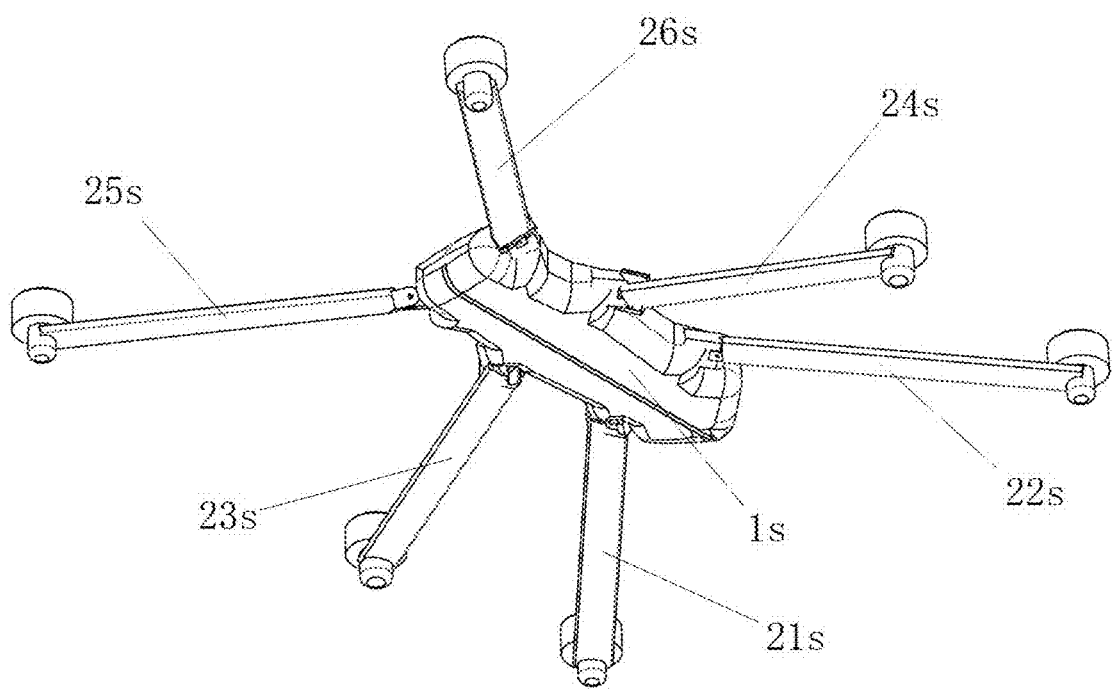
FIG. 12 is a perspective view of a six-arm unmanned helicopter when the arms are deployed according to the present disclosure.
Figure 13:
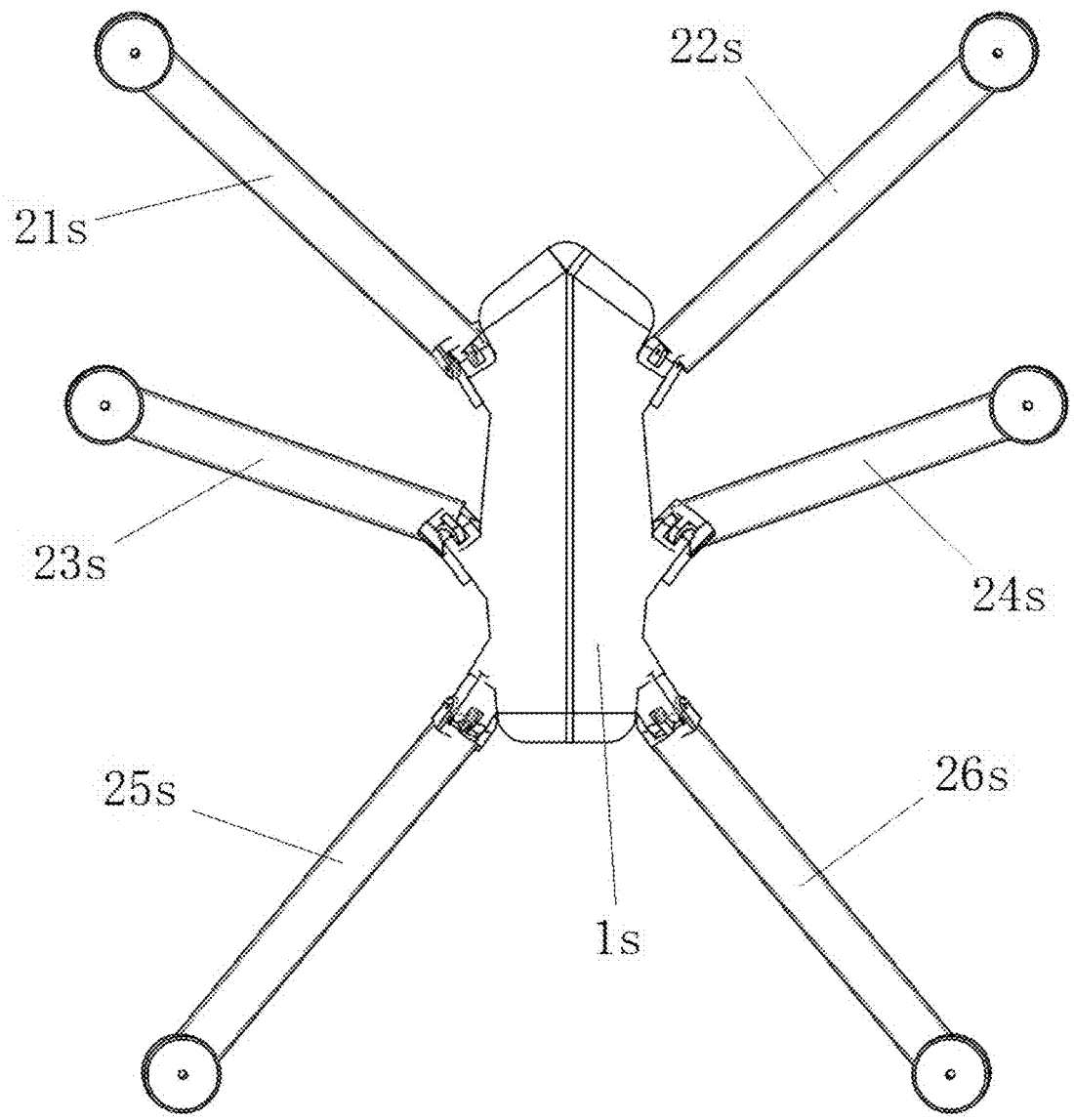
FIG. 13 is a top view of a six-arm unmanned helicopter when the arms are deployed according to the present disclosure.
Figure 14:
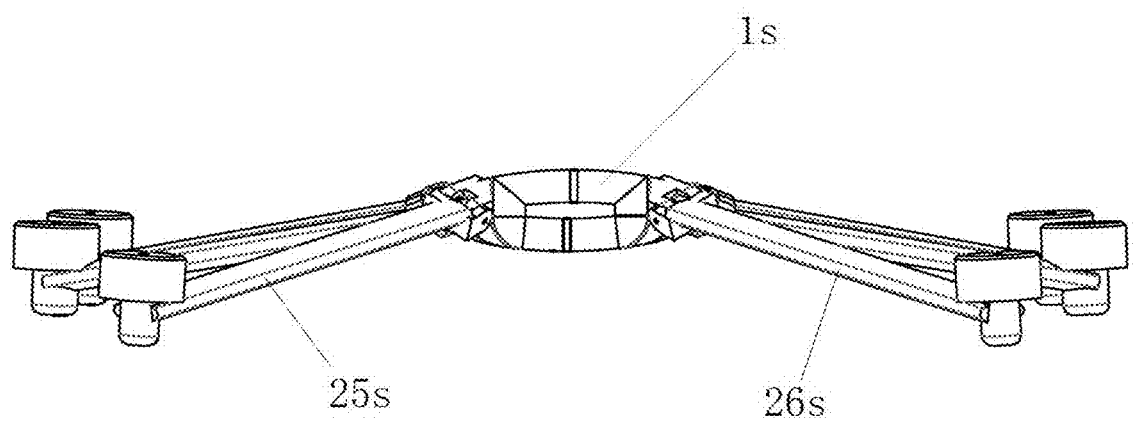
FIG. 14 is a front view of a six-arm unmanned helicopter when the arms are deployed according to the present disclosure.
Figure 15:
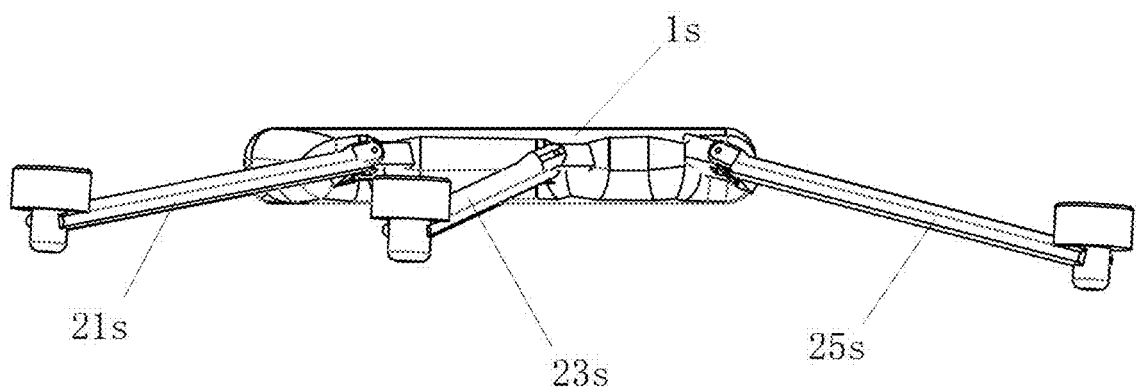
FIG. 15 is a side view of a six-arm unmanned helicopter when the arms are deployed according to the present disclosure.
Figure 16:
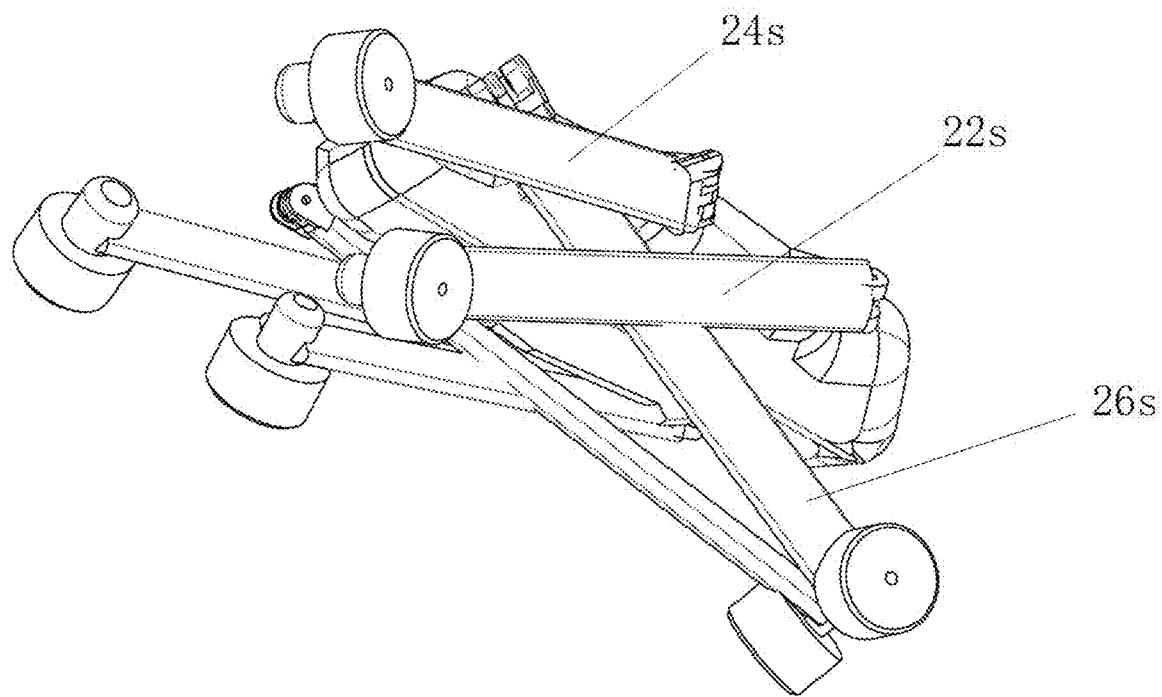
FIG. 16 is a perspective view of a six-arm unmanned helicopter when the arms are folded and stowed according to the present disclosure.
Figure 17:
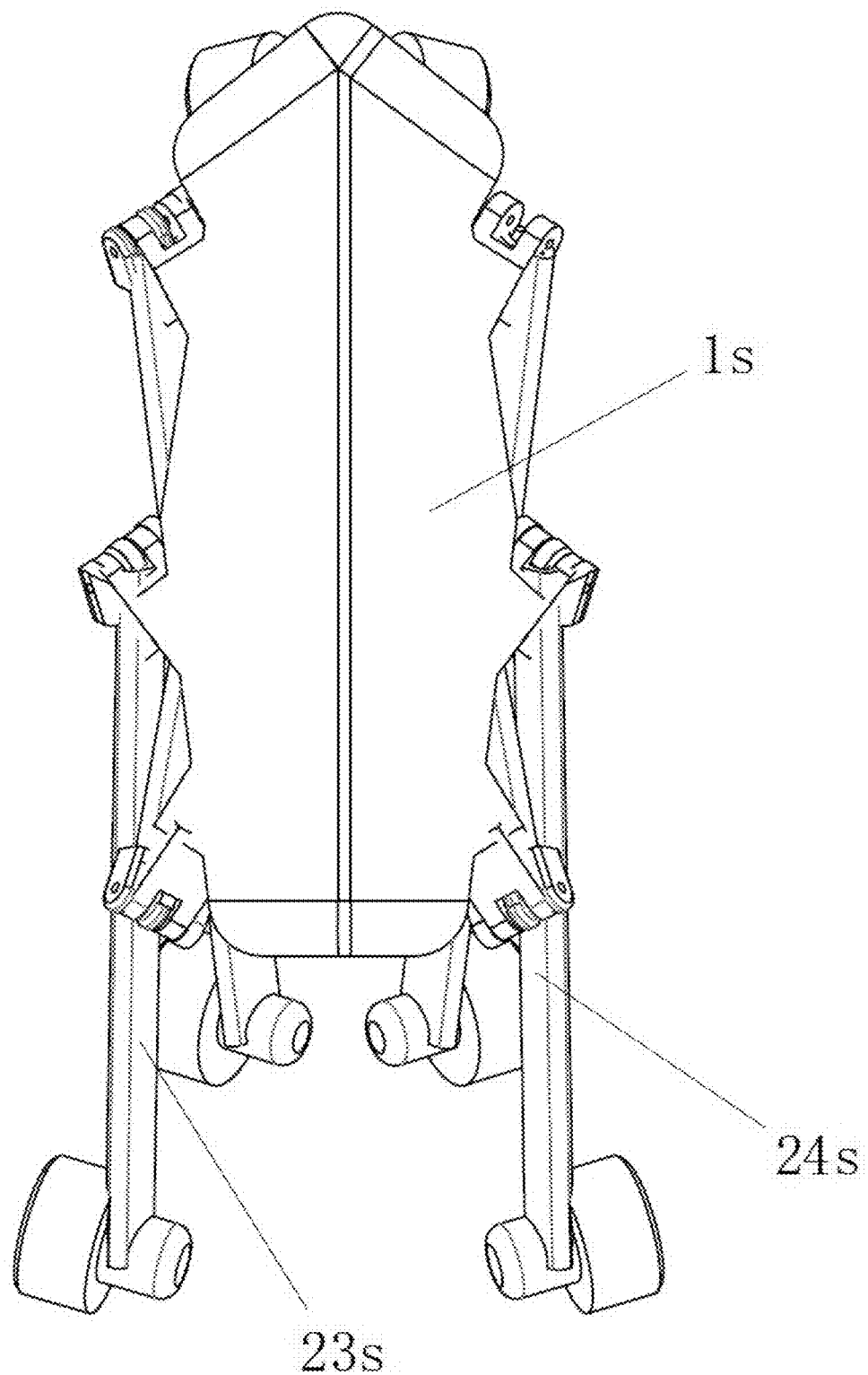
FIG. 17 is a top view of a six-arm unmanned helicopter when the arms are folded and stowed according to the present disclosure.

FIG. 5A, FIG. 6A and FIG. 7A show a top view, a front view and a side view of the four-arm unmanned helicopter when the arms are deployed. More importantly, FIG. 5B, FIG. 6B and FIG. 7B clearly show the partially enlarged views at articulation locations of portion H, portion I and portion J as shown in FIG. 5A, FIG. 6A and FIG. 7A, and clearly show details of articulation locations of the arms and the fuselage.

FIG. 8, FIG. 9, FIG. 10 and FIG. 11 respectively describe a perspective view, a bottom view, a front view and a side view of the four-arm unmanned helicopter when the arms are folded and stowed. Preferably, in the present embodiment, the length of each of the four arms 21, 22, 23, 24 is greater than that of the fuselage 1. When the four arms 21, 22, 23, 24 respectively rotate to get into the folded state, as viewed from bottom view angle of FIG. 9, the other ends of the first group of arms 21, 22 provided with rotors 91, 92 having motors 81, 82 and the corresponding ends of the first group connected with the fuselage can respectively located on both sides of the protrusions of the second group located on the same side of the fuselage, and at the same time, when the four arms all rotate to get into the folded state, as viewed from bottom view angle of FIG. 9, the other ends of the second group of arms 23, 24 provided with rotors 93, 94 having motors 83, 84 and the corresponding ends of the second group connected with the fuselage can respectively located on both sides of the protrusions of the first group located on the same side of the fuselage. The rotors 91, 92, 93, 94 are detachable, and the four arms in the folded states may or may not have rotors.

As shown in FIG. 8, FIG. 9, FIG. 10 and FIG. 11, the first rotation axis in the present disclosure is not parallel to X axis, Y axis or Z axis but form a certain angle, and it is the same with the rotation axes of the remaining arms. Right due to smart selection of angle a and angle b in the present disclosure, although each articulation has one degree of freedom, namely, each arm can only make a rotary movement about a corresponding rotation axis relative to the fuselage 1, the first arm 21 and the third arm 23 on the same side of the fuselage 1 can be folded and stowed without mutual impact, and meanwhile the second arm 22 and the fourth arm 24 on the other side of the fuselage 1 can also be folded and stowed without mutual impact, and the four arms 21, 22, 23, 24 all can achieve none mutual impact, thereby effectively using the underneath space and lateral space of the fuselage 1 so that the folded and stowed unmanned helicopter save space very well. The above single degree of freedom design substantially increases reliability of system connection so that the service life of the unmanned helicopter is substantially prolonged.

The above describes the preferred four-arm unmanned helicopter in the present disclosure.

Embodiment 2: A Six-Arm Unmanned Helicopter

FIG. 12 to FIG. 19 describe a preferred six-arm unmanned helicopter in the present disclosure, wherein FIG. 12 to FIG. 15 are respectively a perspective view, a top view, a front view and a side view of the six-arm unmanned helicopter when the arms are deployed, and wherein FIG. 16 to FIG. 19 are respectively a perspective view, a top view, a front view and a side view of the six-arm unmanned helicopter when the arms are folded and stowed. Different from Embodiment 1, reference numbers in Embodiment 1 all carry a letter s which is an initial letter of six.

As shown in FIG. 12 to FIG. 15, the six-arm unmanned helicopter differs from the above four-arm unmanned helicopter most apparently in using a six-arm arrangement manner to replace the four-arm arrangement manner, and angle setting of the rotation axes of the arms of the six-arm unmanned helicopter is different from the angle setting of the rotation axes of the arms of the four-arm unmanned helicopter. Specifically, the six-arm unmanned helicopter comprises a fuselage 1s whose both sides are respectively provided with three arms 21s, 22s, 23s, 24s, 25s and 26s. One end of each arm 21s, 22s, 23s, 24s, 25s, 26s is connected with the fuselage 1s, and the other end of each arm 21s, 22s, 23s, 24s, 25s, 26s is used to arrange a rotor having a motor. The figures show the motors but do not show rotors. The rotors are detachable and may or may not be mounted. Regarding the perspective view FIG. 12, since the main inventive concept of the present disclosure lies in the arms that may be folded and stowed, FIG. 12 selects a location below a side of the six-arm unmanned helicopter as an observer's location so that the observer may obliquely upwardly observe the bottom of the fuselage 1s and the arms 21s, 22s, 23s, 24s, 25s, 26s of the unmanned helicopter.

Figure 18:
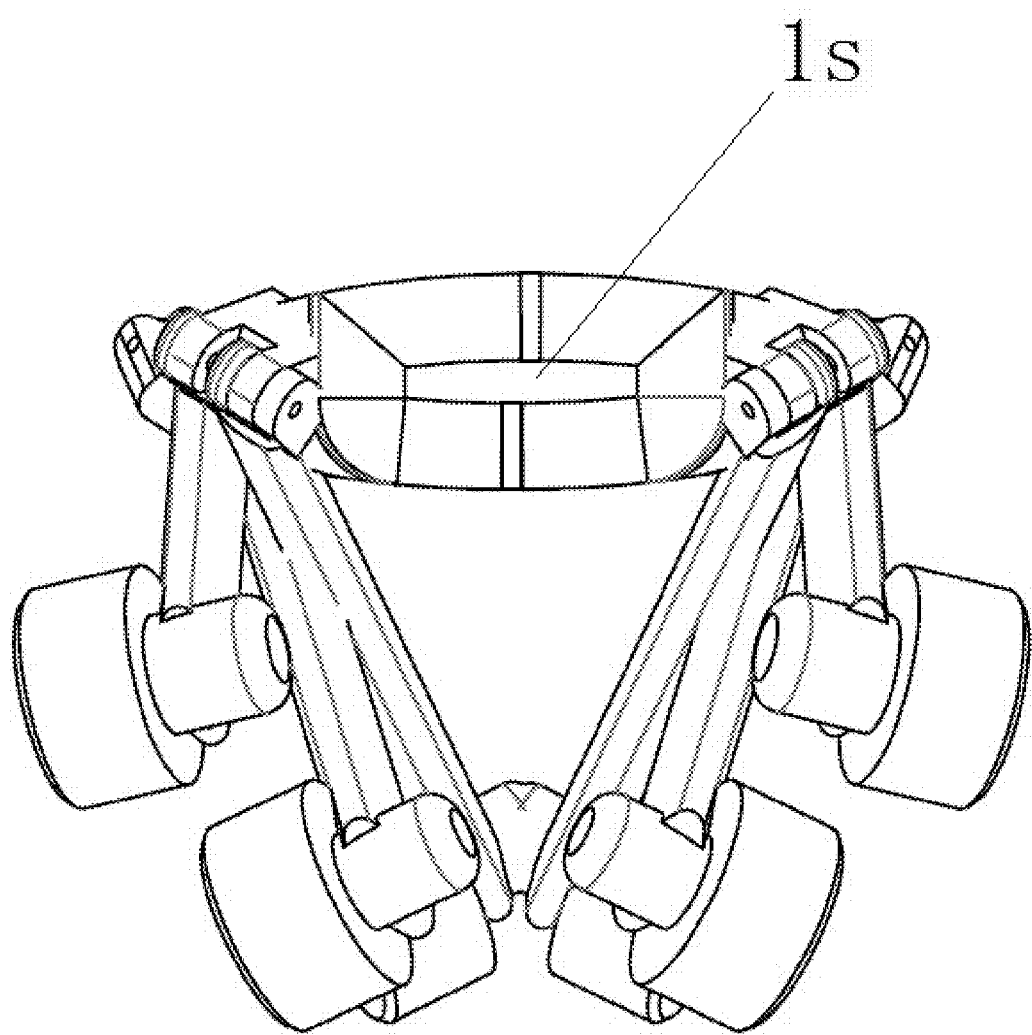
FIG. 18 is a front view of a six-arm unmanned helicopter when the arms are folded and stowed according to the present disclosure.
Figure 19:
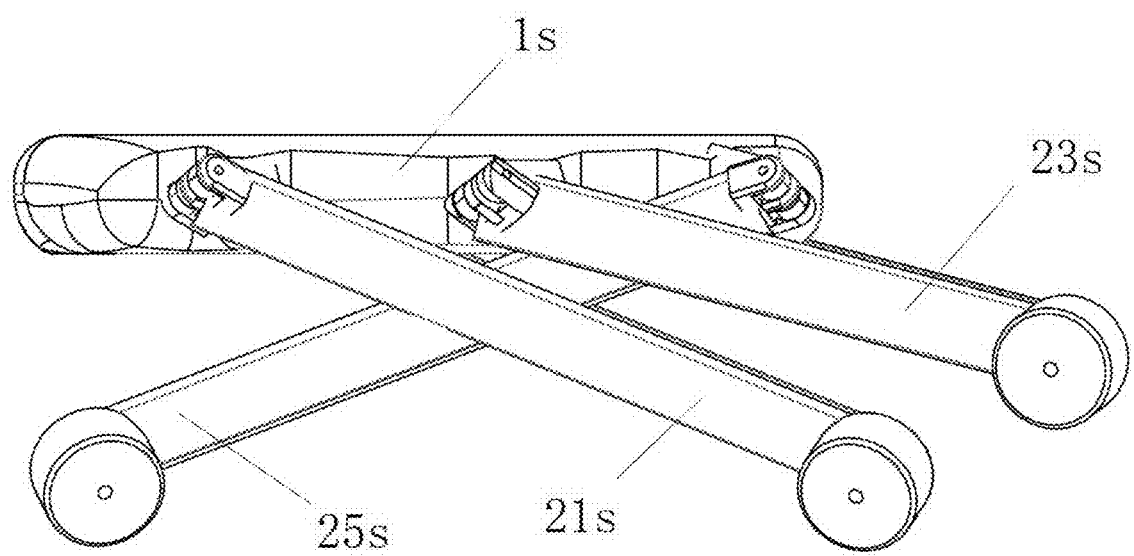
FIG. 19 is a side view of a six-arm unmanned helicopter when the arms are folded and stowed according to the present disclosure.
Figure 20:
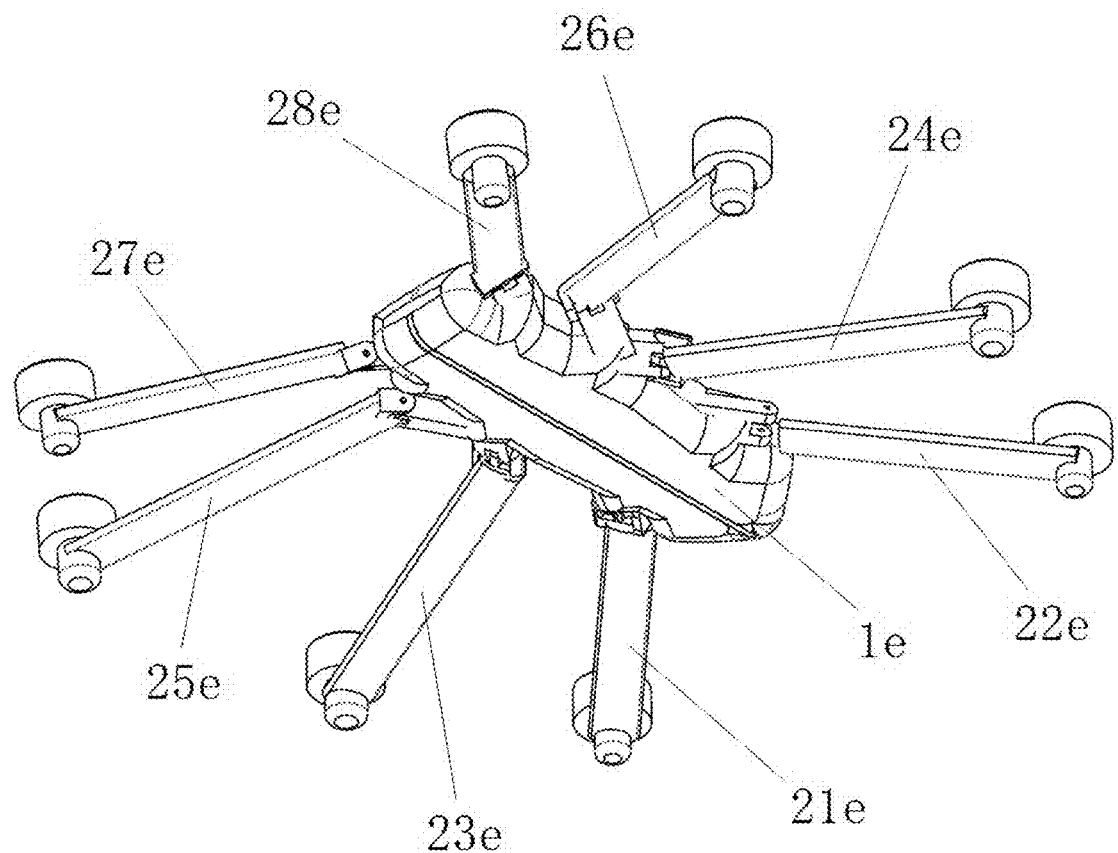
FIG. 20 is a perspective view of an eight-arm unmanned helicopter when the arms are deployed according to the present disclosure.

As can be seen from FIGS. 12-15, the six arms 21s, 22s, 23s, 24s, 25s, 26s of the six-arm unmanned helicopter in the present disclosure are grouped into three groups, namely, a rear group, a middle group and a front group, in turn in a direction of the fuselage 1s. Specifically, the so-called rear, middle and front groups as viewed from the direction of the front view of FIG. 18, are respectively a first group, a second group and a third group. The first group of arms 21s, 22s are arranged symmetrically relative to the axis of the fuselage, and when the two arms 21s, 22s are completely deployed, each of the arms 21s, 22s is at an acute angle relative to a direction of an axis extending outward the fuselage. The second group of arms 23s, 24s are arranged symmetrically relative to the same axis of the fuselage 1s, and when the two arms 23s, 24s are completely deployed, each of the arms 23s, 24s is at an acute angle, a right angle or an obtuse angle relative to the direction of the axis. The third group of arms 25s, 26s are arranged symmetrically relative to the same axis of the fuselage 1s, and when the two arms 25s, 26s are completely deployed, each of the arms 25s, 26s is at an acute angle relative to the direction of the axis extending outward the fuselage 1s.

It needs to be appreciated that three parameters, namely, angle r, angle a and angle b used to describe the rotation axis upon describing the four-arm unmanned helicopter are completely adapted to describe respective rotation axis at connection between the respective arms and the fuselage of six-arm unmanned helicopter. That is to say, depictions of angle r, angle a and angle b with reference to FIG. 4B, FIG. 4E, FIG. 4F, FIG. 4G, FIG. 5B and FIG. 5C are all adapted for the six-arm unmanned helicopter here. Those skilled in the art may clearly understand that the above figures are all exemplary not restrictive.

For purpose of convenient discussion, the first arm $21s$ and second arm $22s$ jointly form the first group of arms, subscript 1 is added to the right lower corner of the above angle r, angle a and angle b, and angle $r_1$, angle $a_1$ and angle $b_1$ represent three angle parameters of the first group of arms; the third arm $23s$ and fourth arm $24s$ jointly form the second group of arms, subscript 2 is added to the right lower corner of the above angle r, angle a and angle b, and angle $r_2$, angle wand angle $b_2$ represent three angle parameters of the second group of arms; the fifth arm $25s$ and sixth arm $26s$ jointly form the third group of arms, subscript 3 is added to the right lower corner of the above angle r, angle a and angle b, and angle $r_3$, angle $a_3$ and angle $b_3$ represent three angle parameters of the third group of arms.

As shown in FIG. 12 through FIG. 15, the fuselage $1s$ is movably connected with each of the arms $21s$, $22s$, $23s$, $24s$, $25s$, $26s$. The movable connection of the first group of arms $21s$, $22s$ enables one end of each of the two arms $21s$, $22s$ connected with the fuselage $1s$ to respectively rotate about a first or second rotation axis at the location of the respective movable connection, wherein a length direction of any arm of the first group of arms $21s$, $22s$ and its corresponding first or second rotation axis form an angle $r_1$, which is most generally $20°<r_1<90°$, generally $68°<r_1<76°$, preferably $70°<r_1<74°$, most preferably $71°<r_1<72°$, for example n=71.73°, at the same time, an angle formed by the first or second rotation axis and the horizontal plane of the fuselage $1s$ is angle $a_1$ which is most generally $1°<a_1<86°$ or $-86°<a_121-1°$, generally $21°<a_1<29°$, preferably $23°<a_1<27°$, most preferably $25°<a_1<26°$, for example $a_1$=25.44°. Meanwhile, a projection line of the first or second rotation axis on the horizontal surface of the fuselage $1s$ and the direction of the axis extending outward the fuselage is form an angle $b_1$ which is most generally $30°<b_1<90°$, generally $55°<b_1<63°$, preferably $57°<b_1<61°$, most preferably $58°<b_1<59°$, for example, $b_1$=58.66°;

The movable connection of the second group of arms $23s$, $24s$ enables one end of each of the two arms $23s$, $24s$ connected with the fuselage is to respectively rotate about a third or fourth rotation axis at the location of the respective movable connection, wherein a length direction of any arm of the second group of arms $23s$, $24s$ and its corresponding third or fourth rotation axis form an angle $r_2$, which is most generally $20°<r_2<160°$, generally $50°<r_2<58°$, preferably $52°<r_2<56°$, most preferably $53°<r_2<54°$, for example $r_2$=53.80°; at the same time, an angle formed by the third or fourth rotation axis and the horizontal surface of the fuselage $1s$ is angle $a_2$ which is most generally $1°<a_2<86°$ or $-86°<a_2<-1°$, wherein $a_2$ and $a_1$ have the same plus or minus sign, generally $28°<a_2<36°$, preferably $30°<a_2<34°$, most preferably $31°<a_2<32°$, for example $a_2$=31.61°. Meanwhile, a projection line of the third or fourth rotation axis on the horizontal surface of the fuselage $1s$ and the direction of the axis extending outward the fuselage is form an angle $b_2$ which is most generally $30°<b_2<150°$, generally $49°<b_2<57°$, preferably $51°<b_2<55°$, most preferably $53°<b_2<54°$, for example, $b_2$=53.07°;

The movable connection of the third group of arms $25s$, $26s$ enables one end of each of the two arms $25s$, $26s$ connected with the fuselage is to respectively rotate about a fifth or sixth rotation axis at the location of the respective movable connection, wherein a length direction of any arm of the third group of arms $25s$, $26s$ and its corresponding fifth or sixth rotation axis form an angle $r_3$, which is most generally $90°<r_3<160°$, generally $96°<r_3<104°$, preferably $98°<r_3<102°$, most preferably $100°<r_3<101°$, for example $r_3$=100.09°; at the same time, an angle formed by the fifth or sixth rotation axis and the horizontal surface of the fuselage $1s$ is angle $a_3$ which is most generally $1°<a_3<86°$ or $-86°<a_3<-1°$, where $a_3$ and $a_1$ have the same plus or minus sign, generally $22°<a_3<30°$, preferably $24°<a_3<28°$, most preferably $25°<a_3<26°$, for example $a_3$=25.97°. Meanwhile, a projection line of the fifth or sixth rotation axis on the horizontal surface of the fuselage $1s$ and the direction of the axis extending outward the fuselage is form an angle $b_3$ which is most generally $90°<b_3<150°$, generally $114°<b_3<122°$, preferably $116°<b_3<120°$, most preferably $117°<b_3<118°$, for example $b_3$=117.61°;

In a preferred embodiment, the fuselage $1s$ and each arm $21s$, $22s$, $23s$, $24s$, $25s$, $26s$ employs a moveable connection therebetween, particularly articulation, wherein a first or second articulation axis at the ends of the first group of arms $21s$, $22s$ connected with the fuselage $1s$ is respectively the corresponding first or second rotation axis; a third or fourth articulation axis at the ends of the second group of arms $23s$, $24s$ connected with the fuselage $1s$ is respectively the corresponding third or fourth rotation axis; a fifth or sixth articulation axis at the ends of the third group of arms $25s$, $26s$ connected with the fuselage is is respectively the corresponding fifth or sixth rotation axis. Furthermore, similar to the articulation manner of the arms with the fuselage of the four-arm unmanned helicopter in Embodiment 1, one end of the six arms $21s$, $22s$, $23s$, $24s$, $25s$, $26s$ of the six-arm unmanned helicopter here connected with the fuselage $1s$ is respectively provided with a lug, and the fuselage $1s$ is correspondingly provided with six protrusions, wherein the six lugs are respectively articulated with the six protrusions. Preferably, each lug is provided with a lug through hole, and correspondingly, each protrusion is provided with a protrusion through hole, each pin passes through each lug through hole and the corresponding protrusion through hole to form articulation.

According to the perspective view, the top view, the front view and the side view of the six-arm unmanned helicopter when the arms are deployed in FIG. 12 to FIG. 15 and in combination with the perspective view, the top view, the front view and the side view of the six-arm unmanned helicopter when the arms are folded and stowed as shown in FIG. 16 through FIG. 19, in the more preferred embodiment of the present disclosure, a first arm $21s$ and a second arm $22s$ in the first group of arms and a fifth arm $25s$ and a sixth arm $26s$ in the third group of arms each have a length greater than the length of the fuselage $1s$, and the length of the second group of arms $23s$, $24s$ is not limited. When the six arms $21s$, $22s$, $23s$, $24s$, $25s$, $26s$ all respectively rotate to get into the folded state, as viewed from the angle of top view, the other ends of the first group of arms $21s$, $22s$ for arranging rotors having motors and the lugs at the ends of the first group connected with the fuselage is can respectively be located on both sides of the protrusions of the third group located on the same side of the fuselage $1s$; and at the same time, when the six arms $21s$, $22s$, $23s$, $24s$, $25s$, $26s$ all respectively rotate to get into the folded state, as viewed from the angle of top view, the other ends of the third group of arms $25s$, $26s$ for arranging rotors having motors and the lugs at the ends of the third group connected with the fuselage is can respectively be located on both sides of the protrusions of the first group located on the same side of the fuselage $1s$; at the same time, when the third arm $23s$ and fourth arm $24s$ in the second group of arms respectively rotate to get into the folded state, its folding direction is identical with the folding direction of the first group of arms, and may be set the same as the folding direction of the second group of arms in other embodiments.

As shown in FIG. 16, FIG. 17, FIG. 18 and FIG. 19, the six-arm unmanned helicopter of the present disclosure is in a folded and stowed state. Right due to smart angle setting of the respective rotation axes of the six arms 21s, 22s, 23s, 24s, 25s, 26s, namely selection of their respective angle r, angle a, and angle b, although each articulation has one degree of freedom, namely, each arm can only make a rotary movement about a corresponding rotation axis relative to the fuselage 1, the arms 21s, 22s, 23s, 24s, 25s, 26s can be folded and stowed without mutual impact and save space. Specifically, the helicopter may be viewed in three directions, namely, a fuselage vertical height direction, a fuselage length direction and a fuselage width direction:

1. In the fuselage is vertical height direction, as shown in the front view of FIG. 18 and the side view of FIG. 19, the arms 21s, 22s, 23s, 24s, 25s, 26s are closer to the plane of the fuselage 1s so they can be retracted as much as possible in the height direction;

2. In the fuselage 1s length direction, as shown in the top view of FIG. 17 and the side view of FIG. 19, the arms 21s, 22s, 23s, 24s, 25s, 26s try to extend in the length direction of the fuselage is to be folded and stowed on both sides of the fuselage and slightly go beyond both ends of the length direction of the fuselage 1s, thereby making full use of the length direction of the fuselage 1s;

3. In the fuselage is width direction, as shown in the front view of FIG. 18 and the top view of FIG. 17, the arms 21s, 22s, 23s, 24s, 25s, 26s are stowed below the width direction of the fuselage is as closely as possible and slightly go beyond the fuselage is width, thereby making full use of the width direction of the fuselage 1s.

The above observations in the three directions the fuselage 1s vertical height direction, the fuselage length direction and the fuselage width direction indicate that the remarkable advantageous effect of the present disclosure in space saving in the three-dimensional space derives from the smart angle setting of the respective rotation axes of the six arms 21s, 22s, 23s, 24s, 25s, 26s in the present disclosure, namely, selection of their respective angle r, angle a and angle b. Meanwhile, the above single degree of freedom design substantially increases reliability of system connection so that the service life of the unmanned helicopter is substantially prolonged.

The above describes the preferred six-arm unmanned helicopter in the present disclosure.

Embodiment 3: An Eight-Arm Unmanned Helicopter

FIG. 20 to FIG. 27 describe a preferred eight-arm unmanned helicopter in the present disclosure, wherein FIG. 20 to FIG. 23 are respectively a perspective view, a top view, a front view and a side view of the eight-arm unmanned helicopter when the arms are deployed, and wherein FIG. 24 to FIG. 27 are respectively a perspective view, a top view, a front view and a side view of the eight-arm unmanned helicopter when the arms are folded and stowed. Different from Embodiment 1 and Embodiment 2, reference numbers in Embodiment 3 all carry a letter e which is an initial letter of eight.

As shown in FIG. 20 to FIG. 23, the eight-arm unmanned helicopter differs from the above four-arm or six-arm unmanned helicopter most apparently in using an eight-arm arrangement manner to replace the four-arm or six-arm arrangement manner, and angle setting of the rotation axes of the arms of the eight-arm unmanned helicopter is different from the angle setting of the rotation axes of the arms of the four-arm or six-arm unmanned helicopter. Specifically, the eight-arm unmanned helicopter comprises a fuselage 1e whose both sides are respectively provided with three arms 21e, 22e, 23e, 24e, 25e, 26e, 27e, 28e. One end of each arm 21e, 22e, 23e, 24e, 25e, 26e, 27e, 28e is connected with the fuselage 1e, and the other end of each arm 21e, 22e, 23e, 24e, 25e, 26e, 27e, 28e is used to arrange a rotor having a motor. The figures show the motors but do not show rotors. The rotors are detachable and may or may not be mounted. Regarding the perspective view FIG. 20, since the main inventive concept of the present disclosure lies in the arms that may be folded and stowed, FIG. 12 selects a location below a side of the eight-arm unmanned helicopter as an observer's location so that the observer may obliquely upwardly observe the bottom of the fuselage 1e and the arms 21e, 22e, 23e, 24e, 25e, 26e, 27e, 28e of the unmanned helicopter.

Figure 21:
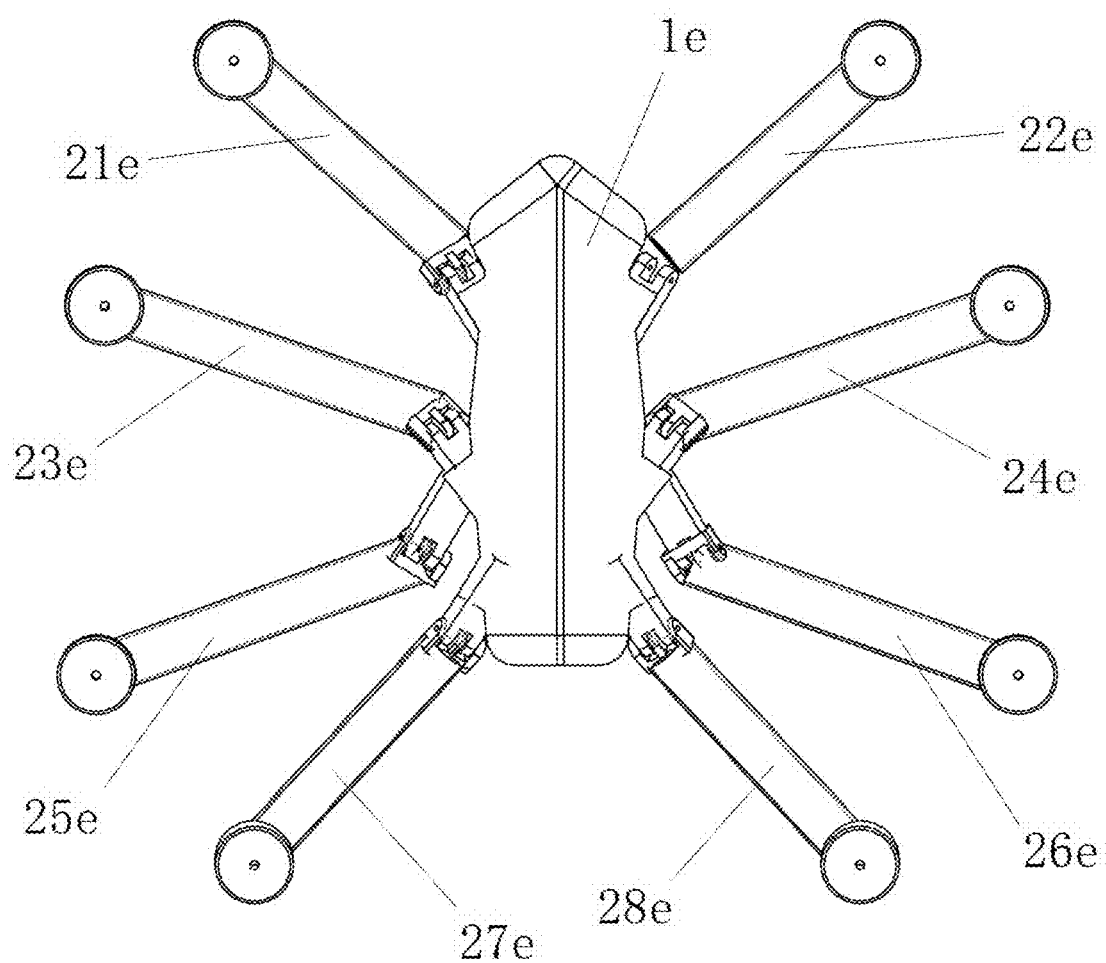
FIG. 21 is a top view of an eight-arm unmanned helicopter when the arms are deployed according to the present disclosure.
Figure 22:
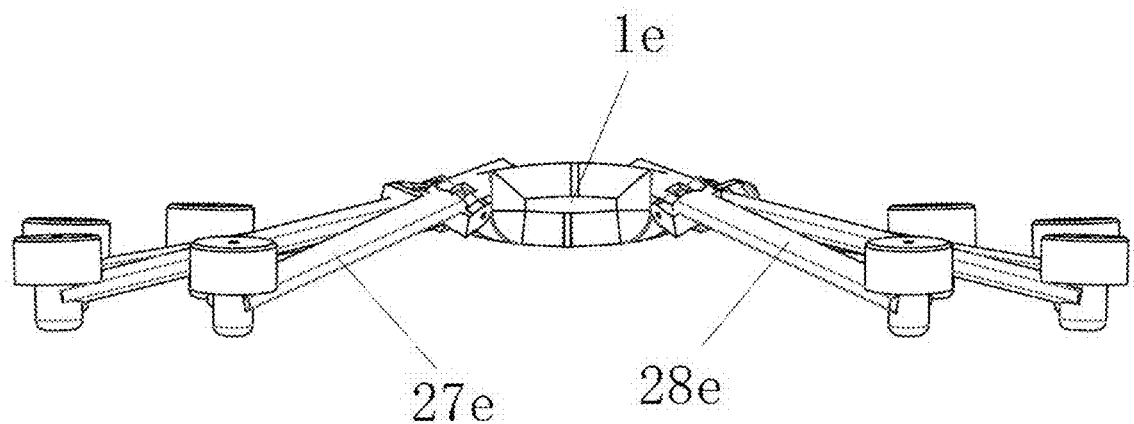
FIG. 22 is a front view of an eight-arm unmanned helicopter when the arms are deployed according to the present disclosure.
Figure 23:
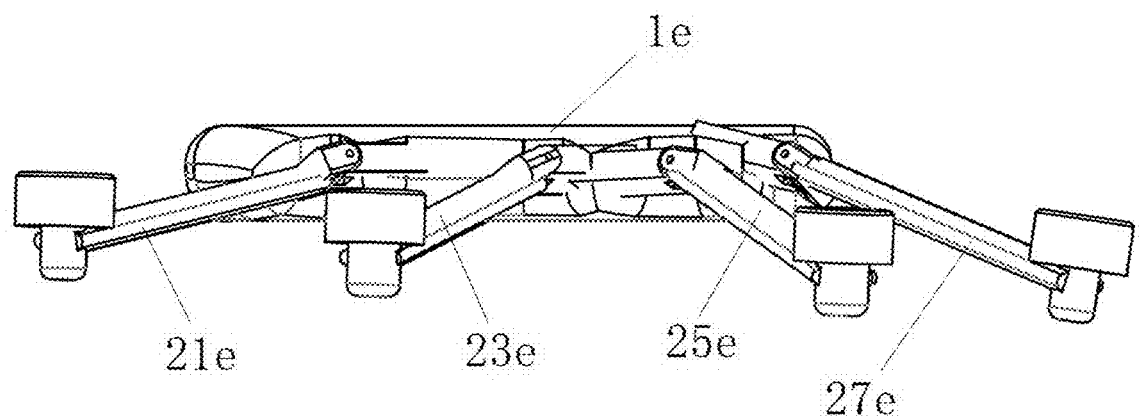
FIG. 23 is a side view of an eight-arm unmanned helicopter when the arms are deployed according to the present disclosure.
Figure 24:
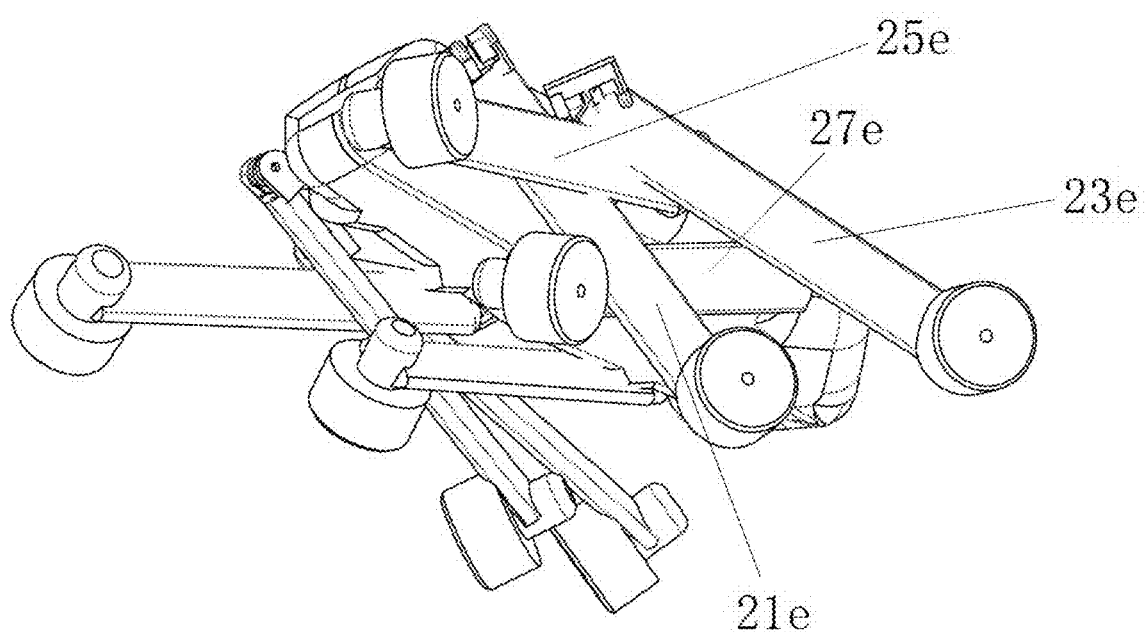
FIG. 24 is a perspective view of an eight-arm unmanned helicopter when the arms are folded and stowed according to the present disclosure.
Figure 25:
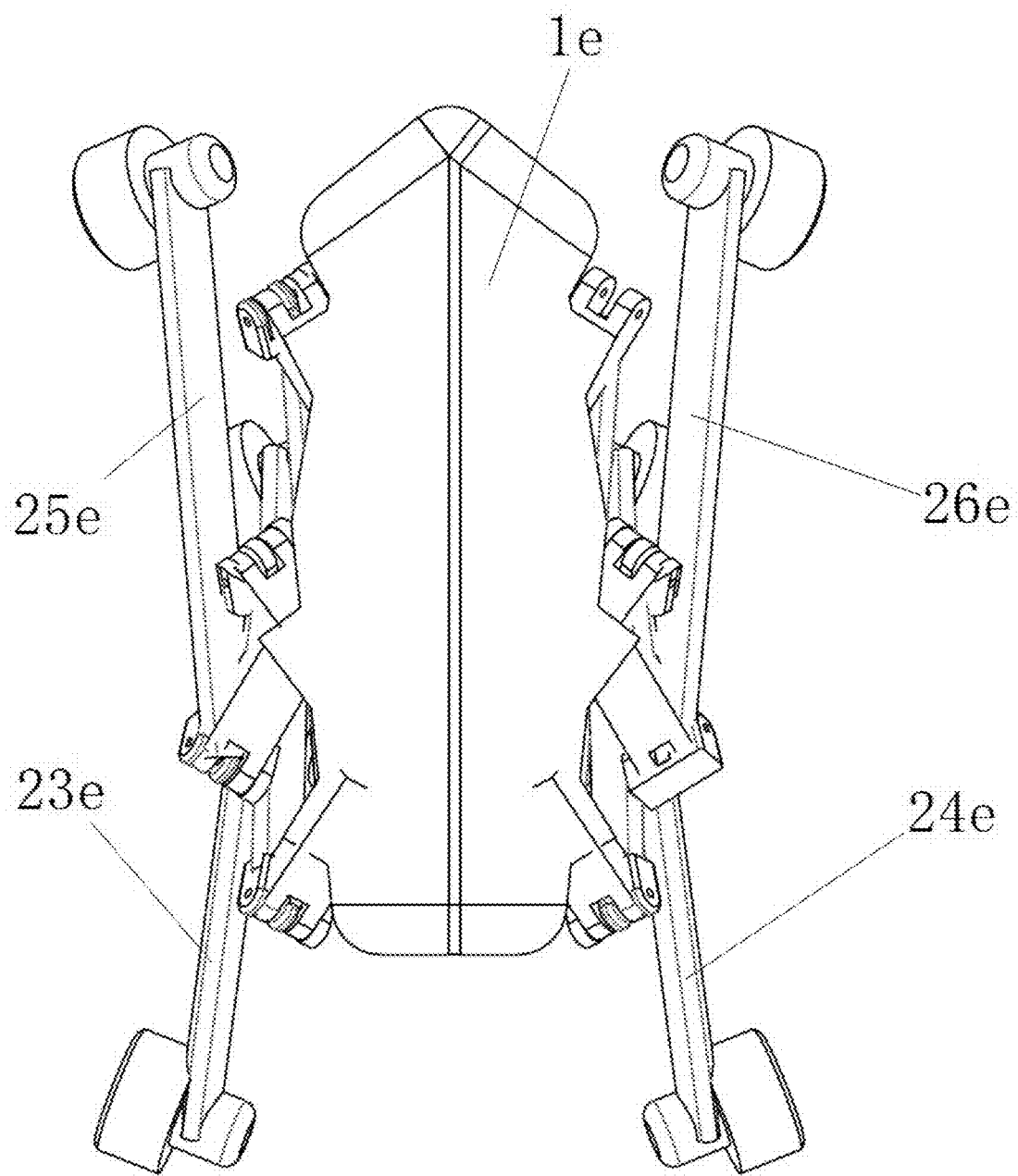
FIG. 25 is a top view of an eight-arm unmanned helicopter when the arms are folded and stowed according to the present disclosure.
Figure 26:
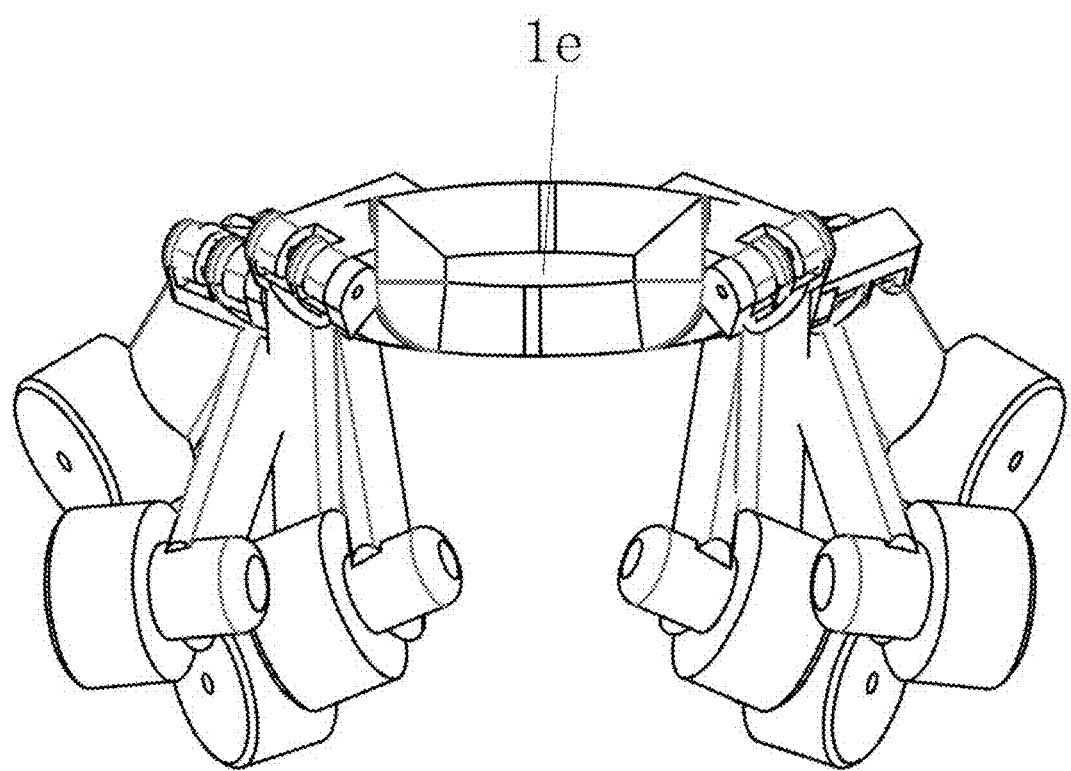
FIG. 26 is a front view of an eight-arm unmanned helicopter when the arms are folded and stowed according to the present disclosure.
Figure 27:
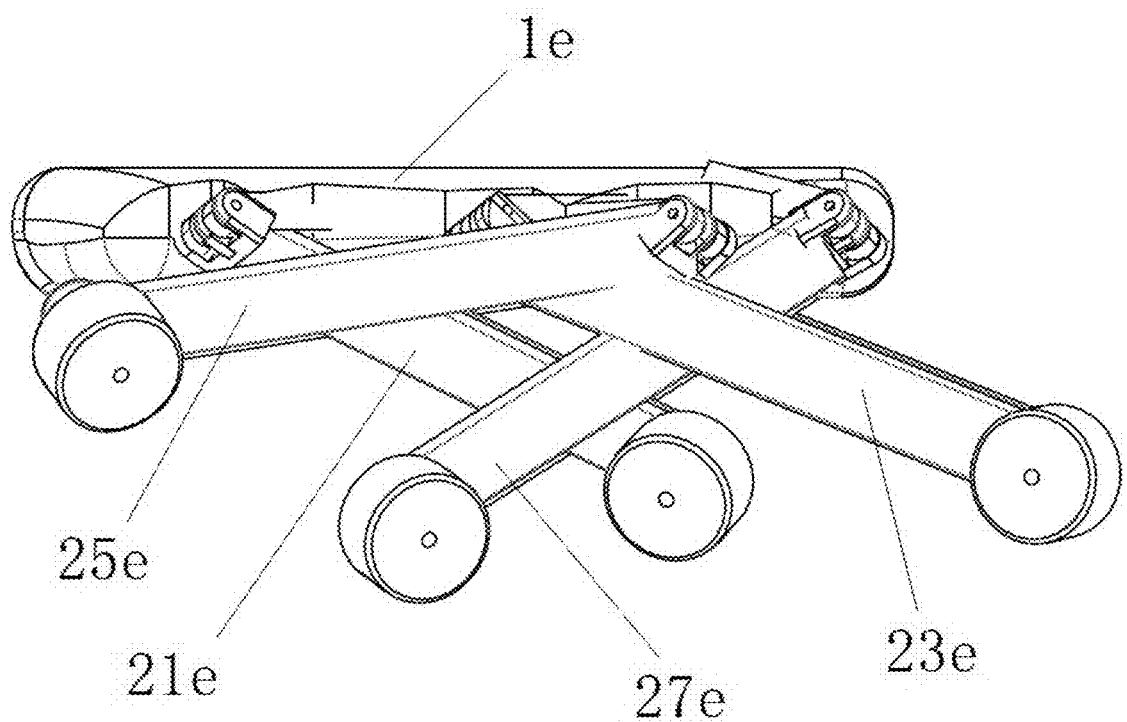
FIG. 27 is a side view of an eight-arm unmanned helicopter when the arms are folded and stowed according to the present disclosure.

As can be seen from FIGS. 20-23, the eight arms 21e, 22e, 23e, 24e, 25e, 26e, 27e, 28e of the eight-arm unmanned helicopter in the present disclosure are grouped into four groups in turn in a direction of the fuselage 1e, respectively a first group, a second group, a third group and a fourth group in turn as viewed from up to down from the top view of FIG. 21. The first group of arms 21e, 22e are arranged symmetrically relative to the axis of the fuselage, and when the two arms 21e, 22e are completely deployed, each of the arms 21e, 22e is at an acute angle relative to a direction of an axis extending outward the fuselage. The second group of arms 23e, 24e are arranged symmetrically relative to the same axis of the fuselage 1e, and when the two arms 23e, 24e are completely deployed, each of the arms 23e, 24e is at an acute angle, a right angle or an obtuse angle relative to the direction of the axis. Preferably, the first group of arms 21e, 22e and the second group of arms 23e, 24e have the same folding direction upon folding and stowing, and both face towards a direction of the axis of the fuselage. The fourth group of arms 27e, 28e are arranged symmetrically relative to the same axis of the fuselage 1e, and when the two arms are completely deployed, each of the arms 27e, 28e is at an acute angle relative to the direction of the axis extending outward the fuselage. The third group of arms 25e, 26e are arranged symmetrically relative to the same axis of the fuselage 1e, and when the two arms 25e, 26e are completely deployed, each of the arms 25e, 26e is at an acute angle, right angle or obtuse angle relative to the direction of the axis. Preferably, the third group of arms 25e, 26e and the fourth group of arms 27e, 28e have the same folding direction upon folding and stowing, and both face towards an opposite direction of the axis of the fuselage. More visually, as can be seen from the side view of the eight-arm unmanned helicopter when the arms are folded and stowed as shown in FIG. 27, the four arms 21e, 22e, 23e, 24e of the first group and second group are folded and stowed in the same direction, and the four arms 25e, 26e, 27e, 28e of the third group and fourth group are folded and stowed in the opposite direction. Therefore, in the preferred embodiment here, the four arms 21e, 22e, 23e, 24e of the first and second groups and the four arms 25e, 26e, 27e, 28e of the third and fourth groups present a crossed state upon folding and stowing. It needs to be appreciated here that the above embodiment is preferable, and it is also possible that the two arms of the first group are folded in the same direction and the six arms of the second, third and fourth groups are folded in an opposite direction, or the two arms of the fourth group are folded in the same direction and the six arms of the first, second and third groups are folded in an opposite direction. Variant forms that can be understood by those skilled in the art all fall within the extent of protection of the present disclosure.

As in the above depictions of the four-arm or six-arm unmanned helicopter, three parameters, namely, angle r, angle a and angle b used to describe the rotation axis upon describing the four-arm or six-arm unmanned helicopter are completely adapted to describe respective rotation axes at connections of the respective arms and the fuselage of eight-arm unmanned helicopter. That is to say, depictions of angle r, angle a and angle b with reference to FIG. 4B, FIG. 4E, FIG. 4F, FIG. 4G, FIG. 5B and FIG. 5C are all adapted for the eight-arm unmanned helicopter here. Those skilled in the art may clearly understand that the above figures are all exemplary not restrictive.

For purpose of convenient discussion, the first arm 21e and second arm 22e jointly form the first group of arms, subscript 1 is added to the above angle r, angle a and angle b, and angle $r_1$, angle $a_1$ and angle $b_1$ represent three angle parameters of the first group of arms; the third arm 23e and fourth arm 24e jointly form the second group of arms, subscript 2 is added to the above angle r, angle a and angle b, and angle $r_2$, angle $a_2$ and angle $b_2$ represent three angle parameters of the second group of arms; the fifth arm 25e and sixth arm 26e jointly form the third group of arms, subscript 3 is added to the above angle r, angle a and angle b, and angle $r_3$, angle $a_3$ and angle $b_3$ represent three angle parameters of the third group of arms; the seventh arm 27e and eighth arm 28e jointly form the fourth group of arms, subscript 4 is added to the above angle r, angle a and angle b, and angle rt, angle $a_4$ and angle $b_4$ represent three angle parameters of the fourth group of arms.

As shown in FIG. 20 through FIG. 23, the fuselage 1e is movably connected with each of the arms 21e, 22e, 23e, 24e, 25e, 26e, 27e, 28e. The movable connection of the first group of arms 21e, 22e enables one end of each of the two arms 21e, 22e connected with the fuselage 1e to respectively rotate about a first or second rotation axis at the location of the respective movable connection, wherein a length direction of any arm of the first group of arms 21e, 22e and its corresponding first or second rotation axis form an angle $r_1$, which is most generally $20°<r_1<90°$, generally $68°<r_1<76°$, preferably $70°<r_1<74°$, most preferably $71°<r_1<72°$, for example $r_1=71.60°$; at the same time, an angle formed by the first or second rotation axis and the horizontal surface of the fuselage 1e is angle $a_1$ which is most generally $1°<a_1<86°$ or $-86°<a_1<-1°$, generally $21°<a_1<29°$, preferably $23°<a_1<27°$, most preferably $25°<a_1<26°$, for example $a_1=25.35°$. Meanwhile, a projection line of the first or second rotation axis on the horizontal surface of the fuselage $1_e$ and the direction of the axis extending outward the fuselage 1e form an angle $b_1$ which is most generally $30°<b_1<90°$, generally $55°<b_1<63°$, preferably $57°<b_1<61°$, most preferably $58°<b_1<59°$, for example, $b_1=58.66°$;

The movable connection of the second group of arms 23e, 24e enables one end of each of the two arms 23e, 24e connected with the fuselage 1e to respectively rotate about a third or fourth rotation axis at the location of the respective movable connection, wherein a length direction of any arm of the second group of arms 23e, 24e and its corresponding third or fourth rotation axis form an angle $r_2$, which is most generally $20°<r_2<160°$, generally $50°<r_2<58°$, preferably $52°<r_2<56°$, most preferably $53°<r_1<54°$, for example $r_2=53.78°$; at the same time, an angle formed by the third or fourth rotation axis and the horizontal surface of the fuselage 1e is angle $a_2$ which is most generally $1°<a_2<86°$ or $-86°<a_2<1°$, wherein $a_2$ and $a_1$ have the same plus or minus sign, generally $15°<a_2<23°$, preferably $17°<a_2<21°$, most preferably $18°<a_2<19°$, for example $a_2=18.66°$. Meanwhile, a projection line of the third or fourth rotation axis on the horizontal surface of the fuselage 1e and the direction of the axis extending outward the fuselage 1e form an angle $b_2$ which is most generally $30°<b_2<150°$, generally $49°<b_2<57°$, preferably $51°<b_2<55°$, most preferably $53°<b_2<54°$, for example, $b_2=53.07°$;

The movable connection of the third group of arms 25e, 26e enables one end of each of the two arms 25e, 26e connected with the fuselage 1e to respectively rotate about a fifth or sixth rotation axis at the location of the respective movable connection, wherein a length direction of any arm of the third group of arms 25e, 26e and its corresponding fifth or sixth rotation axis form an angle $r_3$, which is most generally $20°<r_3<160°$, generally $122°<r_3<130°$, preferably $124°<r_3<128°$, most preferably $126°<r_3<127°$, for example $r_3=126.41°$; at the same time, an angle formed by the fifth or sixth rotation axis and the horizontal surface of the fuselage 1e is angle $a_3$ which is most generally $1°<a_3<86°$ or $-86°<a_3<-1°$, wherein $a_3$ and $a_1$ have the same plus or minus sign, generally $27°<a_3<35°$, preferably $29°<a_3<33°$, most preferably $31°<a_3<32°$, for example $a_3=31.36°$. Meanwhile, a projection line of the fifth or sixth rotation axis on the horizontal surface of the fuselage 1e and the direction of the axis extending outward the fuselage 1e form an angle $b_3$ which is most generally $30°<b_3<150°$, generally $123°<b_3<131°$, preferably $125°<b_3<129°$, most preferably $126°<b_3<127°$, for example $b_3=126.93°$;

The movable connection of the fourth group of arms 27e, 28e enables one end of each of the two arms 27e, 28e connected with the fuselage 1e to respectively rotate about a seventh or eighth rotation axis at the location of the respective movable connection, wherein a length direction of any arm of the fourth group of arms 27e, 28e and its corresponding seventh or eighth rotation axis form an angle $r_4$, which is most generally $90°<r_4<160°$, generally $97°<r_4<105°$, preferably $99°<r_4<103°$, most preferably $100°<r_4<101°$, for example $r_4=100.72°$; at the same time, an angle formed by the seventh or eighth rotation axis and the horizontal surface of the fuselage $1_e$ is angle $a_4$ which is most generally $1°<a_4<86°$ or $-86°<a_4<-1°$, wherein $a_4$ and $a_1$ have the same plus or minus sign, generally $22°<a_{4<30°}$, preferably $24°<a_4<28°$, most preferably $25°<a_4<26°$, for example, $a_4=25.97°$. Meanwhile, a projection line of the seventh or eighth rotation axis on the horizontal surface of the fuselage 1e and the direction of the axis extending outward the fuselage 1e form an angle $b_4$ which is most generally $90°<b_4<150°$, generally $114°<b_4<122°$, preferably $116°<b_4<120°$, most preferably $117°<b_4<118°$, for example $b_4=117.61°$.

In a preferred embodiment, the fuselage 1e and each arm 21e, 22e, 23e, 24e, 25e, 26e, 27e, 28e employs a moveable connection, particularly articulation, wherein a first or second articulation axis at the ends of the first group of arms 21e, 22e connected with the fuselage 1e is respectively the corresponding first or second rotation axis; a third or fourth articulation axis at the ends of the second group of arms 23e, 24e connected with the fuselage 1e is respectively the corresponding third or fourth rotation axis; a fifth or sixth articulation axis at the ends of the third group of arms 25e, 26e connected with the fuselage 1e is respectively the corresponding fifth or sixth rotation axis; a seventh or eighth articulation axis at the ends of the fourth group of arms 27e, 28e connected with the fuselage 1e is respectively the corresponding seventh or eighth rotation axis. Furthermore, similar to the articulation manner of the arms with the fuselage of the four-arm unmanned helicopter in Embodiment 1, the end of each of the eight arms 21e, 22e, 23e, 24e, 25e, 26e, 27e, 28e of the eight-arm unmanned helicopter connected with the fuselage 1e is respectively provided with a lug, and the fuselage 1e is correspondingly provided with eight protrusions, wherein the eight lugs are respectively articulated with the eight protrusions. Preferably, each lug is provided with a lug through hole, and correspondingly, each protrusion is provided with a protrusion through hole, and each pin passes through each lug through hole and the corresponding protrusion through hole to form articulation.

According to the perspective view, the top view, the front view and the side view of the eight-arm unmanned helicopter when the arms are deployed in FIG. 20 to FIG. 23 and in combination with the perspective view, the top view, the front view and the side view of the eight-arm unmanned helicopter when the arms are folded and stowed as shown in FIG. 24 through FIG. 27, in the more preferred embodiment of the present disclosure, when the eight arms 21e, 22e, 23e, 24e, 25e, 26e, 27e, 28e all respectively rotate to get into the folded state, as viewed from the angle of top view, the other ends of the first group of arms 21e, 22e for arranging rotors having motors and the lugs at the ends of the first group connected with the fuselage 1e can respectively be located on both sides of the protrusions of the third group located on the same side of the fuselage 1e; the other ends of the second group of arms 22e, 24e for arranging rotors having motors and the lugs at the ends of the second group connected with the fuselage 1e can respectively be located on both sides of the protrusions of the fourth group located on the same side of the fuselage 1e; and at the same time, when the eight arms 21e, 22e, 23e, 24e, 25e, 26e, 27e, 28e respectively rotate to get into the folded state, as viewed from the angle of top view, the other ends of the third group of arms 25e, 26e for arranging rotors having motors and the lugs at the ends of the third group connected with the fuselage 1e can respectively be located on both sides of the protrusions of the first group located on the same side of the fuselage 1e; the other ends of the fourth group of arms 27e, 28e for arranging rotors having motors and the lugs at the ends of the fourth group connected with the fuselage 1e can respectively be located on both sides of the protrusions of the second group located on the same side of the fuselage 1e; in the preferred embodiment, the first group of arms 21e, 22e and the second group of arms 23e, 24e have the same folding direction upon folding and stowing, and both face towards a direction of the axis of the fuselage; the third group of arms 25e, 26e and the fourth group of arms 27e, 28e have the same folding direction upon folding and stowing, and both face towards an opposite direction of the axis of the fuselage.

As shown in FIG. 24, FIG. 25, FIG. 26 and FIG. 27, the eight-arm unmanned helicopter of the present disclosure is in a folded and stowed state. Right due to smart angle setting of the respective rotation axes of the eight arms 21e, 22e, 23e, 24e, 25e, 26e, 27e, 28e, namely selection of their respective angle r, angle a, and angle b, although each articulation has one degree of freedom, namely, each arm can only make a rotary movement about a corresponding rotation axis relative to the fuselage 1e, the arms 21e, 22e, 23e, 24e, 25e, 26e, 27e, 28e can be folded and stowed without mutual impact and save space. Specifically, the helicopter may be viewed in three directions, namely, a fuselage vertical height direction, a fuselage length direction and a fuselage width direction:

1. In the fuselage 1e vertical height direction, as shown in the front view of FIG. 26 and the side view of FIG. 27, the arms 21e, 22e, 23e, 24e, 25e, 26e, 27e, 28e are closer to the plane of the fuselage 1e so they can be retracted as much as possible in the height direction;

2. In the fuselage 1e length direction, as shown in the top view of FIG. 25 and the side view of FIG. 27, the arms 21e, 22e, 23e, 24e, 25e, 26e, 27e, 28e try to extend in the length direction of the fuselage 1e to be folded and stowed on both sides of the fuselage and slightly go beyond both ends of the length direction of the fuselage 1e, thereby making full use of the length direction of the fuselage 1e;

3. In the fuselage 1e width direction, as shown in the front view of FIG. 26 and the top view of FIG. 25, the arms 21e, 22e, 23e, 24e, 25e, 26e, 27e, 28e are stowed below the width direction of the fuselage 1e as closely as possible and slightly go beyond the fuselage 1e width, thereby making full use of the width direction of the fuselage 1e.

The above observations in the three directions the fuselage 1e vertical height direction, the fuselage length direction and the fuselage width direction indicate that the remarkable advantageous effect of the present disclosure in space saving in the three-dimensional space derives from the smart angle setting of the respective rotation axes of the eight arms 21e, 22e, 23e, 24e, 25e, 26e, 27e, 28e in the present disclosure, namely, selection of their respective angle r, angle a and angle b. Meanwhile, the above single degree of freedom design substantially increases reliability of system connection so that the service life of the unmanned helicopter is substantially prolonged.

The above describes the preferred eight-arm unmanned helicopter in the present disclosure.

It needs to be particularly appreciated that the above three specific embodiments, the four-arm unmanned helicopter, the six-arm unmanned helicopter and the eight-arm unmanned helicopter, have the same inventive concept, namely, smartly select, in a three-dimensional space, the angle a and angle b of the rotation axes at the locations of connection of the arms and the fuselage, and angle r between the arms and the rotation axes so that the respective arms can rotate with a single degree of freedom about the rotation axes. Specifically, when the arms are in a completely deployed state, the helicopter is in a flying state; when respective arms are folded about the corresponding rotation axes, the helicopter is in a folded and stowed state. There are innumerable angle selection manners in the three-dimensional space. Based on the respective characteristics of the four-arm unmanned helicopter, the six-arm unmanned helicopter and the eight-arm unmanned helicopter according to the present disclosure, the corresponding angle a, angle b and angle r are respectively selected smartly, arms after being folded overlap, meanwhile the arms do not interfere with one another so that the structure of the unmanned helicopter in the folded state is very compact and effectively saves space, and the helicopter occupies a space as small as possible, so the size of the fuselage may be reduced in the case of the same deployment size. Meanwhile, the single degree of freedom design substantially increases reliability of system connection so that the service life of the unmanned helicopter is substantially prolonged.

The embodiments of the present disclosure are described above in detail with reference to figures, but the present disclosure is not limited to the above embodiments. It is further possible to make diverse variations without departing from the essence of the present disclosure within the scope of knowledge possessed by those having ordinary skill in the art.

What is claimed is:

1. An unmanned helicopter, comprising:
a fuselage having a length and a width, wherein a length direction of the fuselage defines a first axis, and a width direction of the fuselage defines a second axis, the first and second axes defining a first plane;
a plurality of arms comprising at least a first pair of arms and a second pair of arms, each arm having a first end movably connected with the fuselage via a respective movable connection defining a respective rotation axis and a second end connected with a respective rotor, and wherein the arms of each of the first and second pairs are arranged symmetrically relative to the first axis of the fuselage;
wherein a first arm of the first pair is configured to rotate about a first rotation axis between a first deployed position and a second folded position, the first rotation axis oriented such that a length direction of the arm is offset from the first rotation axis by an acute angle $r_1$, the first rotation axis and the first plane are offset by an acute angle $a_1$, and a projection line of the first rotation axis onto the first plane and the direction of the first axis are offset by an acute angle $b_1$.

2. The unmanned helicopter of claim 1, wherein the first rotation axis is oriented such that $20°<r_1, <90°$, $1°<a_1<86°$, and $30°<b_1<90°$.

3. The unmanned helicopter of claim 2, wherein the first rotation axis is oriented such that $72°<r_1<80°$, $23°<a_1<31°$, and $43°<b_1<51°$.

4. The unmanned helicopter of claim 3, wherein the first rotation axis is oriented such that $74°<r_1<78°$, $25°<a_1<29°$, and $45°<b_1<49°$.

5. The unmanned helicopter of claim 1, wherein a second arm of the second pair is configured to rotate about a second rotation axis, the second rotation axis oriented such that a length direction of the second arm is offset from the second rotation axis by an acute angle $r_2$, the second rotation axis and the first plane are offset by an acute angle $a_2$, and a projection line of the second rotation axis onto the first plane and the direction of the first axis are offset by an acute angle $b_2$.

6. The unmanned helicopter of claim 5, wherein the second rotation axis is oriented such that $r_2$, $20°<r_2<160°$, $1°<a_2<86°$, and $90°<b_2<150°$.

7. The unmanned helicopter of claim 6, wherein the second rotation axis is oriented such that $114°<r_2<122°$, $23°<a_2<31°$, and $115°<b_2<123°$.

8. The unmanned helicopter of claim 7, wherein the second rotation axis is oriented such that $116°<r_2<120°$, $25°<a_2<29°$, and $117°<b_2<121°$.

9. The unmanned helicopter of claim 1, wherein each arm comprises a respective lug that forms the respective movable connections with a respective protrusion formed on the fuselage, wherein the respective lugs are able to articulate relative to the respective protrusions.

10. The unmanned helicopter of claim 9, wherein each of respective lugs is provided with a lug through hole, and each respective protrusion corresponding thereto is provided with a protrusion through hole, and wherein a respective pin passes through each of said lug through hole and the corresponding protrusion through hole to form articulation.

11. The unmanned helicopter of claim 1, wherein a length of each arm is greater than a distance between the respective movable connection connecting the arm to the fuselage and a neighboring movable connection connecting another arm of the plurality of arms to the same side of the fuselage.

12. The unmanned helicopter of claim 1, wherein when the first arm is rotated to the second folded position, the first and second ends of the first arm are positioned on opposite sides along the first axis of a moveable connection between the fuselage and an arm of the second pair located on the same side of the fuselage as the first arm.

13. The unmanned helicopter of claim 1, wherein the rotors are detachable from the second ends of each of the plurality of arms.

14. The unmanned helicopter of claim 1, wherein the plurality of arms further comprises a third pair of arms, the arms of the third pair arranged symmetrically relative to the first axis of the fuselage.

* * * * *